United States Patent [19]

Yamashita et al.

[11] Patent Number: 4,937,690
[45] Date of Patent: Jun. 26, 1990

[54] AUTOMATIC EXCHANGING SYSTEM FOR STORAGE AND RETRIEVAL OF MAGNETIC TAPE CASSETTES

[75] Inventors: Kazuichi Yamashita, Kyoto; Teruhisa Yokota, Osaka; Masaaki Notani, Osaka; Tsutomu Katsuta, Osaka, all of Japan

[73] Assignee: Matsushita Electric Industrial Co., Ltd., Osaka, Japan

[21] Appl. No.: 173,747

[22] Filed: Mar. 25, 1988

[30] Foreign Application Priority Data

Mar. 26, 1987 [JP] Japan ................... 62-72427

[51] Int. Cl.5 ........................................ G11B 15/68
[52] U.S. Cl. ........................ 360/92; 360/69; 360/71; 360/94
[58] Field of Search ........................ 360/92-94, 360/91, 69, 71, 137

[56] References Cited

U.S. PATENT DOCUMENTS

| 3,831,197 | 8/1976 | Beach et al. | 360/71 |
| 3,938,190 | 2/1976 | Semmlow et al. | 360/92 X |
| 4,271,440 | 6/1981 | Jenkins et al. | 360/69 X |
| 4,348,152 | 9/1982 | Takamatsu | 360/92 X |
| 4,779,151 | 10/1988 | Lind et al. | 360/69 X |
| 4,802,035 | 1/1989 | Ohtsuka | 360/92 |

FOREIGN PATENT DOCUMENTS 3712087 10/1987 Fed. Rep. of Germany ........ 360/92
61-61646 4/1986 Japan.

Primary Examiner—John H. Wolff
Attorney, Agent, or Firm—Lowe, Price, LeBlanc, Becker & Shur

[57] ABSTRACT

An automatic cassette exchanging system for performing cassette exchange between an information recording/reproducing device such as VTR and a cassette storage device. The automatic cassette exchanging system has a basic unit comprising a box and a fixing type cassette storage case which is placed in line in the box with the information recording/reproducing device so that a robot moving space is formed in the front side portion of the box so as to face cassette entrance and exit ports of the fixing type cassette storage case. A cassette exchanging robot is provided in the robot moving space to be movable orthogonally for the cassette exchange therebetween. The automatic cassette exchanging system allows addition of a unit or units comprising a box which has a robot moving space and a rotatable type cassette storage case whose cassette entrance and exit ports can face the robot moving space. The basic unit box and the addition unit box can be coupled detachably to each other so that their robot moving spaces are coupled to each other, resulting in easy increase of the cassette storage capacity.

14 Claims, 25 Drawing Sheets

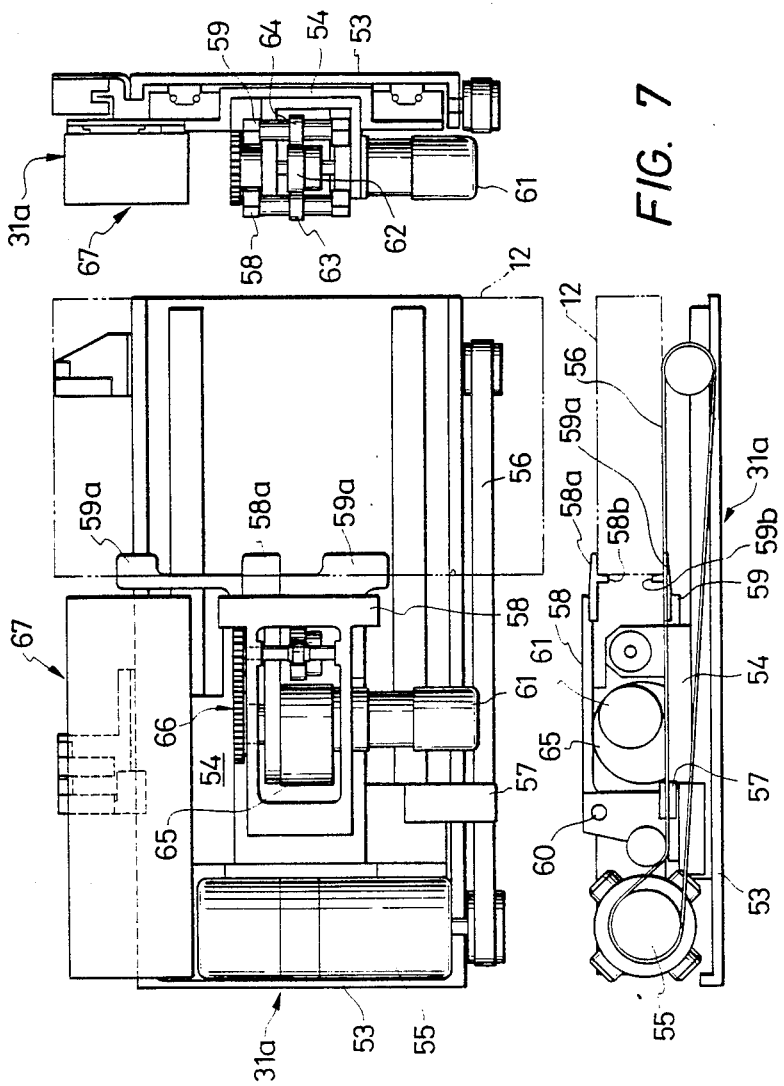

FIG. 30
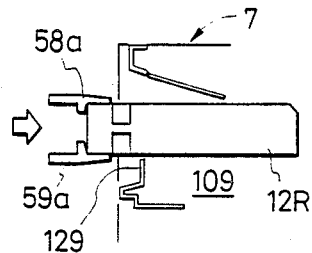
(R1)
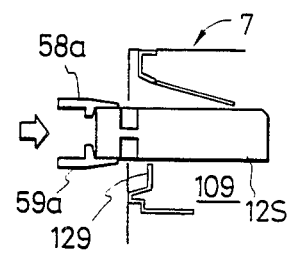
(S1)
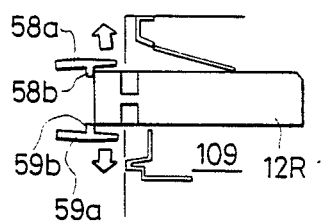
(R2)
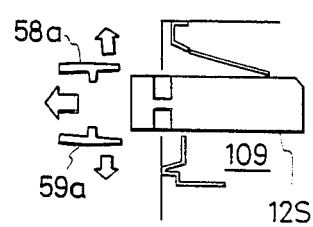
(S2)
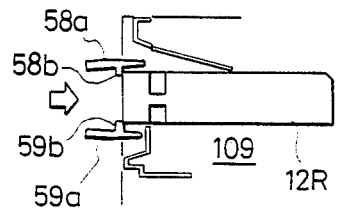
(R3)
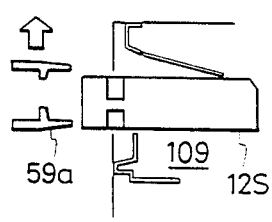
(S3)
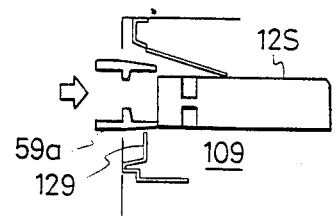
(S4)

FIG. 31
(R1)
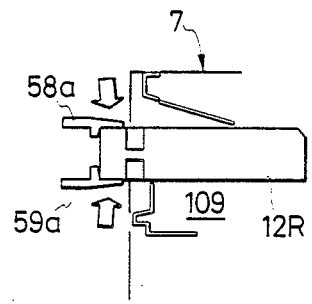
(R2)
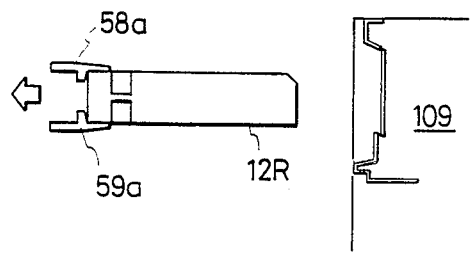
(S1)
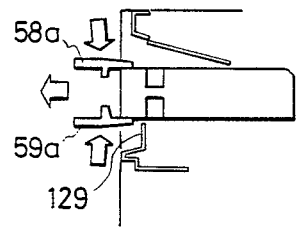
(S2)
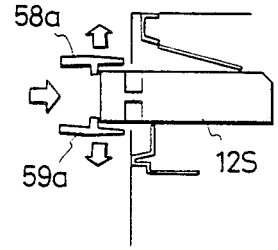
(S3)
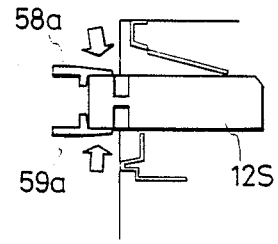
(S4)
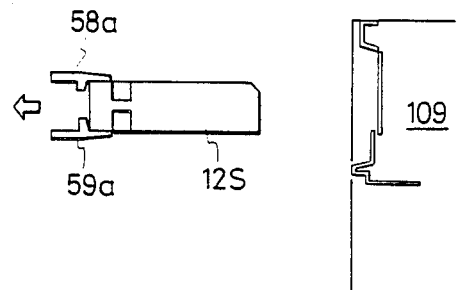

AUTOMATIC EXCHANGING SYSTEM FOR STORAGE AND RETRIEVAL OF MAGNETIC TAPE CASSETTES

BACKGROUND OF THE INVENTION

The present invention relates generally to storage and retrieval systems for magnetic cassettes or the like, and more particularly to an automatic exchanging system for magnetic tape cassettes which are alternatively transferred between a storage area and a play station. This invention may be embodied, for example, in a system for automatically exchanging a video tape cassette in a television (TV) broadcasting station, but it will be appreciated that it is also useful in other applications.

Known is a cassette automatic exchanging system having a robot arranged so as to select one from a large number of cassettes in a cassette storage case and to automatically supply it to an information recording/reproducing apparatus such as video tape recorder (VTR), such as disclosed in Japanese Utility Model Provisional Publication No. 61-61646, U.S. Pat. Nos. 3,831,197 and 3,938,190.

An important problem in the conventional automatic cassette exchanging systems relates to their cassette storage capacities being fixed respectively. This results in the fact that the automatic cassette exchanging system should be manufactured independently in accordance with the cassette storage capacity required in a TV broadcasting station and difficulty is encountered to easily expand the cassette storage area in response to requirements of addition of the cassette storage capacity. A further important problem in the conventional automatic cassette exchanging systems relates to the fact that the cassette exchanging operation is made by means of a single robot. This causes no cassette exchanging operation when the robot malfunctions and further causes slow cassette exchanging operation with the number of the stored cassettes being large. A still further aspect of the conventional automatic cassette exchanging systems is that the exchanging operation can be made only between cassettes equal in dimension to each other. This aspect would result in inconvenience in use of the system.

SUMMARY OF THE INVENTION

The present invention has been developed in order to remove the drawbacks inherent to the conventional automatic cassette exchanging systems.

It is therefore an object of the present invention to provide a new and improved automatic cassette exchanging system which is capable of adding to the cassette storage area to increase its cassette storage capacity and further surely and quickly effect the cassette exchanging operation.

An automatic cassette exchanging system according to the present invention has a basic storage unit comprising a box and a fixed cassette storage case which is aligned in the box with an information recording/reproducing apparatus. A space is formed in the box facing entrance and exit ports of the fixed cassette storage case and a cassette exchanging robot is provided for movement in the space for inserting and extracting cassettes at selected locations. The automatic cassette exchanging system allows addition of one or more units comprising a box which has a rotatable type cassette storage case with cassette entrance and exit ports that can face a similar space in which a robot can be moved. The basic unit box and the addition unit box can be detachably coupled to each other with their spaces adjoining in a continuum. A robot comprises a support structure and a manipulator whereby positioning and insertion and removal of cassettes can be performed by remote control.

In this arrangement the addition of units to the basic storage unit may be done selectively and easily to form a suitable cassette exchanging system in accordance with the cassette storage capacity required in a TV broadcasting station, for example. Increasing the cassette storage capacity, can be achieved merely connecting the addition units to the basic unit. Furthermore, the basic unit and the addition units are coupled to each other so that their robot moving spaces are coupled in line to each other and therefore this makes easy the connection work and the robot movement between the basic and addition units. Here, while the basic unit has the fixed cassette storage case with a control box provided rearwardly, the addition unit has the rotatable type cassette storage case to increase the cassette storage capacity as compared with the fixed cassette storage case.

In the automatic cassette exchanging system of this invention, in order to quickly perform the cassette exchanging operation, the above-mentioned robot comprises a main robot and a subrobot, the main robot being placed in the robot moving space so as to effect the cassette exchange between the information recording/reproducing apparatus and cassette storage portions of the cassette storage case closer thereto and, on the other hand, the subrobot being provided therein so as to perform the cassette exchange between the information recording/reproducing apparatus and cassette storage portions thereof apart therefrom.

Furthermore, the automatic cassette exchanging system of this invention is arranged to allow the continuous execution of the cassette exchange irrespective of failure of one of the main robot and subrobot. The cassette exchanging system has a means for checking whether the main robot and subrobot are in the normal conditions and, for example, in response to abnormality of the main robot, the subrobot is controlled in order to perform the cassette exchanging operation in place of the main robot.

A further feature of the present invention is that the cassette exchanging operation can be performed between two types cassettes which are different in dimension.

In accordance with the present invention, there is provided a cassette exchanging system for exchaning a cassette to be loaded to information recording/reproducing means, comprising: basic unit means including a housing and a cassette storage case having a number of cassette encasing portions for encasing a number of cassettes and placed in the basic unit housing, the information recording/reproducing means being placed in the basic unit housing so as to be aligned with the fixed cassette storage case to form a robot movement space at the front of the basic unit housing, each of the cassette encasing portions having an entrance and exit port for the cassette which is positioned to face the robot moving space formed at the front thereof; robot means movably provided in the robot movement space of the basic unit means so as to perform cassette exchanging operation between the information recording/reproducing means and the fixing type cassette storage case; and control means for controlling said robot means, wherein said basic unit means is arranged so as to be selectively and detachably coupled to additional unit means having a housing and at least one rotatable type cassette storage case placed in said additional unit housing so as to form a second robot movement space at the front of the addition unit housing to establish a communication with the first-mentioned robot movement space of the basic unit means whereby the robot means is movable within both the first and second robot movement spaces to allow the cassette exchange between the information recording-/reproducing means and the fixed cassette storage case or the rotatable type cassette storage case when the additional unit means is coupled to said basic unit means.

In accordance with the present invention, there is further provided a cassette exchanging system for performing exchange of cassettes to be loaded to information recording/reproducing means, comprising: housing means in which the information recording/reproducing means are placed; cassette storage means placed in the housing means so that it is arranged in line with the information recording/reproducing means so as to form a robot movement space at the front of the housing means; first robot means provided in the robot movement space so as to perform the cassette exchange between the information recording/reproducing means and a first cassette encasing portion of the cassette storage means which is close to said information recording-/reproducing means; and second robot means provided in the robot movement space so as to perform the cassette exchange between the information recording/reproducing means and a second cassette encasing portion of the cassette storage means which further from said information recording-/reproducing means than the first cassette encasing portion.

In accordance with the present invention, there is further provided a cassette exchanging system for performing exchange of cassettes to be loaded to information recording/reproducing means, comprising: housing means in which said information recording/reproducing means are placed; cassette storage means having a plurality of cassette encasing portions and being placed in said housing means so that it is arranged in line with said information recording/reproducing means so as to form a robot movement space at the front of the housing means; robot means comprising a main robot and a subrobot which are provided in said robot movement space of housing means so as to perform the cassette exchange between said information recording-/reproducing menas and said cassette storage means; checking means for checking whether said main robot is in the normal condition; and control means coupled to said robot means and said checking means for, when said main robot is in the normal condition, controlling said main robot to perform the cassette exchange between said information recording/reproducing means and a first cassette encasing portion of said cassette storage means which is close to said information recording/reproducing means and controlling said subrobot to effect the cassette exchange between a second cassette encasing portion of said cassette storage means, which is further away from said information recording-/reproducing means, and a predetermined cassette encasing portion of said cassette storage means and for, when said main robot is not in the normal condition, controlling said subrobot so as to perform the cassette exchange between said information recording/reproducing means and the overall cassette storage means.

In accordance with the present invention, there is provided further a cassette exchanging system for performing exchange of cassettes to be loaded to information recording/reproducing means, comprising: housing means in which said information recording/reproducing means are placed; cassette storage means having a plurality of cassette encasing portions and being placed in said housing means so that it is arranged in line with said information recording/reproducing means so as to form a robot movement space at the front side portion of the housing means; robot means comprising a main robot and a subrobot which are provided in said robot movement space of said housing means so as to perform the cassette exchange between said information recording/reproducing means and said cassette storage means; checking means for checking whether said subrobot is in the normal condition; and control means coupled to said robot means and said checking means for, when said subrobot is in the normal condition, controlling said main robot to perform the cassette exchange between said information recording/reproducing means and a first cassette encasing portion of said cassette storage means which is close to said information recording/reproducing means and controlling said subrobot to effect the cassette exchange between a predetermined cassette encasing portion of said cassette storage means and a second cassette encasing portion of said cassette storage means which is further away from said information recording/reproducing means and for, when said subrobot is not in the normal condition, controlling said main robot so as to perform the cassette exchange between said information recording/reproducing means and the overall cassette storage means.

In accordance with the present invention, there is further provided a cassette exchanging system for performing cassette exchange between information recording/reproducing means and a cassette storage means having a plurality of cassette encasing portions for encasing pluralities of first and second cassettes different in dimension, said first cassette being greater in dimension that said second cassette and each of said cassette encasing portions being formed so as to accommodate both said first and second cassettes, comprising: robot means movably placed at a robot movement space formed so that said robot means faces said information recording/reproducing means and said plurality of cassette encasing portions of said cassette storage means, said robot means having at least one manipulator for holding said cassette and means for reading data indicated at the front surface of each of said cassettes; and control means coupled to said robot means for reading size information of said cassette and for, when said second small-sized cassette is encased in said cassette encasing portion of said cassette storage means by means of said robot means, controlling said manipulator so that said second small-sized cassette is encased therein to cause its front surface to be coincident with that of said first large-sized cassette when encased and for, when said second small-sized cassette is inserted into a portion of said information recording/reproducing means by means of said robot means, controlling said manipulator so that said second small-sized cassette is inserted thereinto to cause its rear surface to be coincident with that of said first large-sized cassette when inserted.

In accordance with the present invention, there is provided a cassette exchanging system for performing exchange of cassettes between information recording-/reproducing means and cassette storage means having a plurality of cassette encasing portions for encasing a plurality of cassettes, comprising: robot means having a pair of manipulators for holding said cassette to allow insertion and removal into and from said information recording/reproducing means and said cassette storage means, said pair of manipulators being independent of each other; checking means for checking whether said pair of manipulators are in normal conditions; and control means coupled to said robot means and said checking means for, when said pair of manipulators are is in normal condition, controlling said main robot so that one member of said pair of manipulators performs one of the insertion and removal of said cassette into and from said information recording/reproducing means and said cassette storage means and the other member of said pair performs the remainder operation and for, when one member of said pair of manipulators is not in the normal condition, controlling said main robot so as to perform all of the cassette exchange between said information recording/reproducing means and the cassette storage means by means of the other manipulator which is in the normal condition.

BRIEF DESCRIPTION OF THE DRAWINGS

The object and features of the present invention will become more readily apparent from the following detailed description of the preferred embodiments taken in conjunction with the accompanying drawings in which:

FIG. 6 is a plan view of the manipulator of FIG. 5;

FIG. 7 is a side view of the manipulator of FIG. 5;

FIG. 8 is an elevation view of the manipulator of FIG. 5;

FIG. 30 (R1) (R3) and (S1)-(S4) is an illustration for describing the cassette insertion work to the VTR set by means of the manipulator;

FIG. 31 (R1) (R2) and (S1)-(S4) is an illustration for describing the cassette taking-out with respect to the VTR set by means of the manipulator;

DETAILED DESCRIPTION OF THE INVENTION

Figure 1:
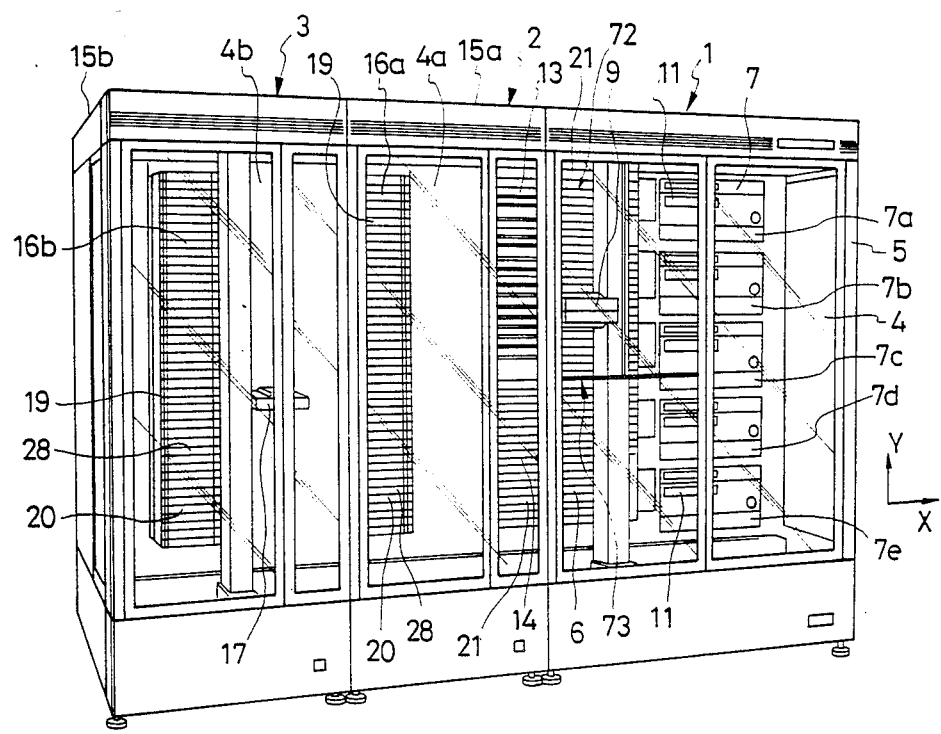
FIG. 1 is a perspective view of an automatic cassette exchanging system according to an embodiment of the present invention.
Figure 2:
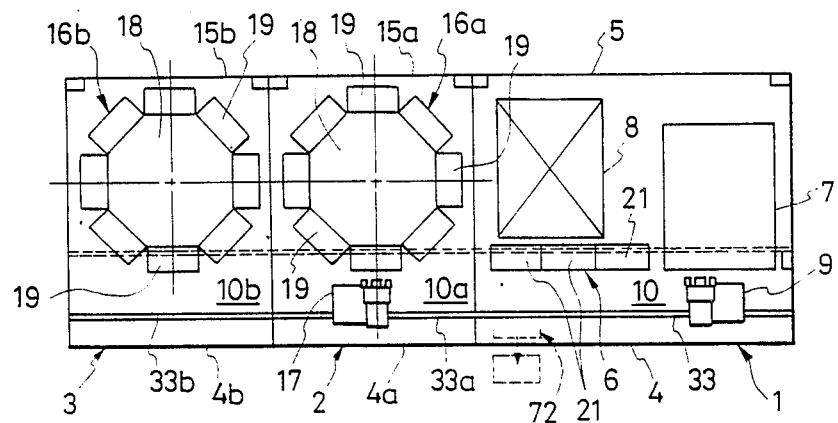
FIG. 2 is a plan view showing schematically the automatic cassette exchanging system according to the embodiment.
Figure 3:
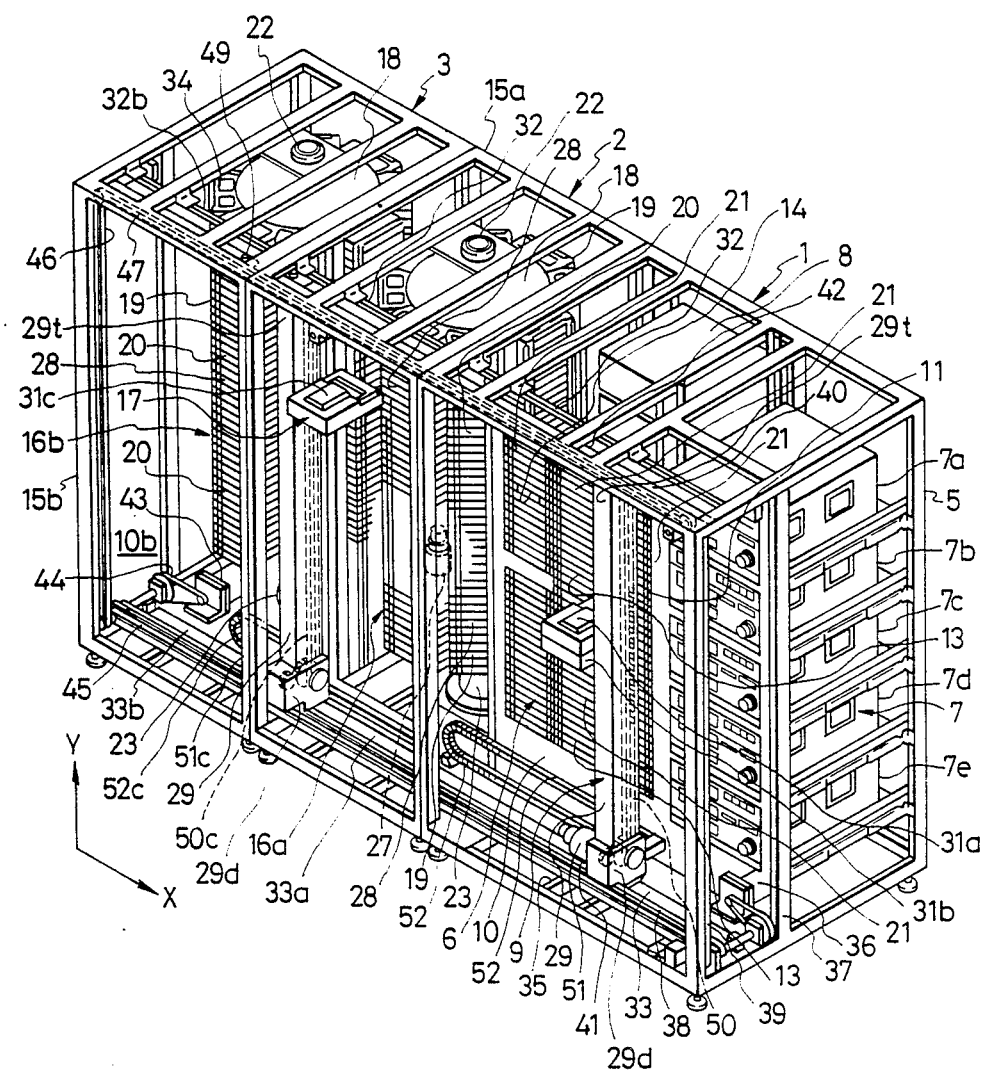
FIG. 3 is a perspective view showing units without the outer portions.

Referring now to FIGS. 1 through 3, there is illustrated an automatic exchanging system for automatically performing exchange between video tape cassettes in which first and second addition units 2 and 3 are added in connection with a basic unit 1. Although the basic unit 1 has all the functions required for the automatic cassette exchange, because its cassette storage capacity is limited, the first and second addition units 2 and 3 are added thereto in order to increase the cassette storage capacity. Here, in accordance with the magnitude of the required cassette storage capacity, either only the first addition unit 2 is coupled to the basic unit 1 or further third and fourth addition units will be connected thereto.

The basic unit 1 is in a basic unit box 5 having an openable and closable guard glass 4 at its front side including a fixed cassette storage case 6, a VTR set (information recording/reproducing apparatus) 7, a control box 8 and a cassette exchange robot (main robot) 9. The basic unit box 5, cubically shaped, provides a space 10 at its front for the robot movement, in which the main robot 9 is provided to be movable in X-directions (left and right directions) and Y-directions (up and down directions). At the right side of the basic unit box 5 is provided the VTR set comprising a plurality of decks 7a through 7e which are arranged vertically, so that each of entrance and exit ports 11 for cassettes faces the robot movement space 10. In the illustration, it has five decks and, of these decks, four decks 7a through 7d are normally used and the lowermost deck 7e is on standby.

On the other hand, in the left side through the intermediate portion of the basic unit box 5 is provided the fixed cassette storage case 6 facing the robot movement space 10. This fixed storage case 6 has a number of cassette storage portions 13 which are arranged in matrix in the X and Y directions and each of which stores a video-tape encased cassette 12. In the illustration, to form the fixed storage case 6 are arranged three rack cases 21 each having a number of vertical racks. The opening portion (cassette entrance and exit port) 14 of each of the cassette storage portions 13 is opened to the robot movement space 10.

The depth of the fixing type cassette storage case 6 may be determined so as to allow accommodation of the cassette 12 and therefore results in extremely short length as compared with the depth of the VTR set 7. Accordingly, at the rear of the fixed cassette storage case 6 is formed a great space which is in turn used for provision of the control box 8.

The first and second addition units 2 and 3 have rotatable type cassette storage cases 16a and 16b in their addition unit boxes 15a and 15b having openable and closable guard glass plates 4a and 4b at their front sides, respectively. The addition unit boxes 15a and 15b are respectively shaped cubically and have the same height and depth as the basic unit box 5, but the width is slightly smaller than that of the basic unit box 5. The front spaces of the addition unit boxes 15a and 15b are respectively used as robot moving spaces 10a and 10b where a cassette exchanging robot (subrobot) 17 is provided to be movable in the X and Y directions. The rotatable type cassette storage cases 16a and 16b are arranged so as to occupy most of the internal space of the addition unit boxes 15a and 15b other than the robot moving space and to be rotatable horizontally about vertical axes. Each of the rotatable type cassette storage cases 16a and 16b, as shown in FIG. 3, comprises a drum-shaped base body 18 and eight rack cases 19 attached to the peripheral surface of the drum-shaped base body 18 so as to form an octagonal pole configuration, each of the eight rack cases 18 having a number of racks extending vertically. A number of cassette storage portions 20 of each of the first and second addition units 2 and 3, being divided by the racks, can accommodate approximately 8/3 of the number of the cassettes 12 to be encased in the cassette storage portions 13 of the basic unit 1, thereby resulting in considerable advance in cassette accommodating number as compared with only the basic unit 1. Each of the base bodies 18 is at its top and bottom portions supported rotatably by means of bearings 22 and 23. For driving each of the rotatable type cassette storage cases 16a and 16b, a case drive motor 27 is coupled through a transmission belt and appropriate gearing. The case drive motor 27 is driven under control of the control box 8 so that one of the rack cases 19 selected from the rotatable cassette storage cases 16a and 16b faces the robot movement spaces 10a, 10b and an opening (cassette entrance and exit port) 28 of a cassette storage portion 20 of the selected rack case 19 is opened to the robot movement spaces 10b and 10c.

Figure 4:
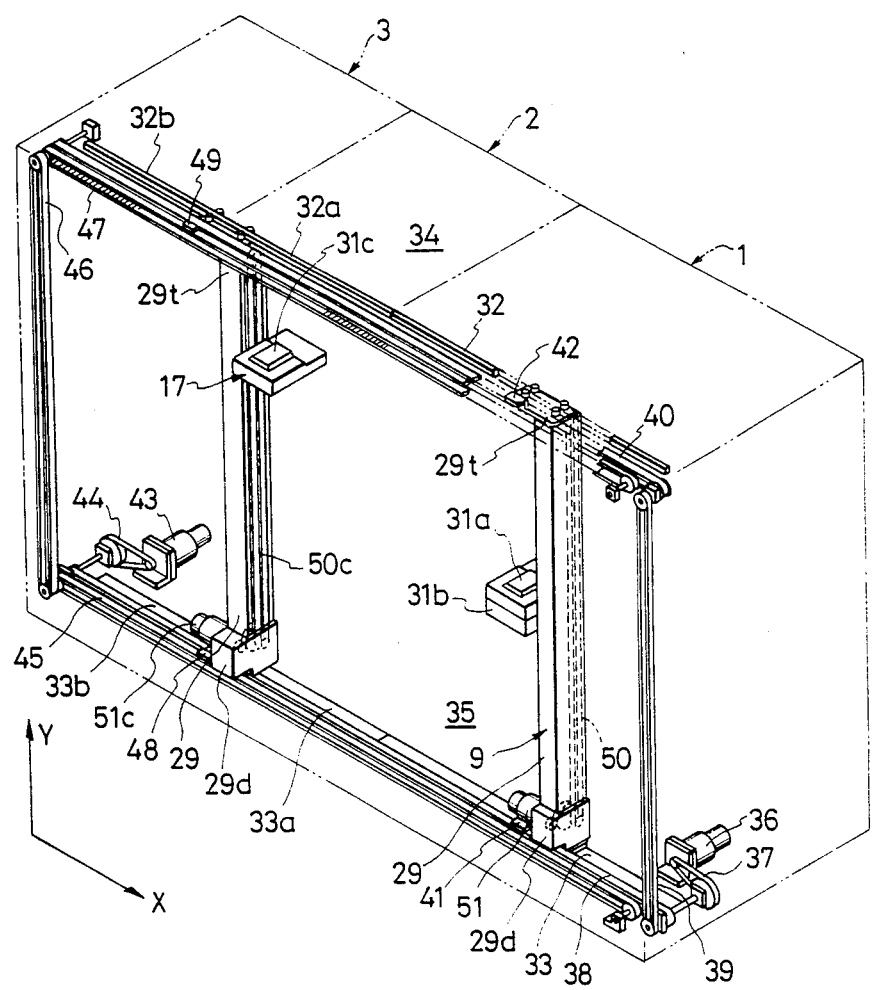
FIG. 4 is a perspective view showing cassette exchanging robots and drive system therefor.

As illustrated in the drawings, the basic unit 1, first addition unit 2 and second addition unit 3 are connected to each other in the left and right directions so that the respective robot movement spaces 10, 10a and 10b becomes in communicated relation to each other. In the case of use of only the basic unit 1, a left side plate is provided so as to cover the entire left side surface of the basic unit 1, and in the case of the connection thereamong, the portion covering the left side surface of the robot moving space 10 may be removed. In the robot movement spaces 10, 10a and 10b, which are coupled to each other are provided two cassette exchanging robots, i.e., the main robot 9 and the subrobot 17, so as to be movable in the X and Y directions. These robots 9 and 17, as shown in FIG. 3, are composed of pole-shaped body portions 29 movable in the X directions and manipulators 31a, 31b and 31c movable in the Y directions along the body portions 29. The robots 9 and 17 are essentially similar in structure with each other, except that the pair of manipulators 31a and 31b belong to the robot 9 and the single manipulator 31c belongs to the robot 17. The pole-like body portions 29, as shown in FIGS. 3 and 4, are moved in the X directions with their upper end portions 29t and their lower end portions 29d being guided by means of upper guid rails 32, 32a and 32b and lower guid rails 33, 33a and 33b. The upper guid rails 32, 32a and 32b are installed independently on the box top surfaces 34 of the respective units 1, 2 and 3, but they can be connected linearly in response to connection thereof. Furthermore, the lower guid rails 33, 33a and 33b are installed independently on the box bottom surfaces 35 of the respective units 1, 2 and 3 so that similarly they can be connected linearly when the units 1, 2 and 3 are connected to each other. Here, the upper guid rails 32, 32a and 32b function so as to prevent the body portions 29 from moving in the traverse directions and the lower guid rails 33, 33a and 33b act not only to prevent the body portions 29 from moving in the traverse directions but also to carry the loads thereof. The upper and lower guid rails 32, 32a, 32b and 33, 33a and 33b are in common used for the robots 9 and 17.

On the box bottom surface 35 of the basic unit 1 is installed a main robot drive motor 36 whose rotation is transferred through a pulley 37 and so on to a first timing belt 38 stretched in parallel to the lower guid rails 33, 33a and 33b and further transferred through the pulley 37, a transmission timing belt 39 stretched in the up and down directions to a second timing belt 40 provided in parallel to the upper guide rails 32, 32a and 32b. The first and second timing belts 38 and 40 are respectively stretched between the the right end portions of the basic unit 1 and the left end portions of the second addition unit 3. To the first timing belt 38 with a mounting device 41 is attached the lower end portion 29d of the body portion 29 of the main robot 9 and to the second timing belt 40 with a mounting device 42 is attached the upper end portion 29t of the body portion 29 thereof, whereby the rotation of the main robot drive motor 36 causes the body portion 29 to move in the X directions. On the other hand, on the box bottom surface 35 of the second addition unit 3 is provided a subrobot drive motor 43 whose rotation is transferred through a pulley 44 and so on to a third timing belt 45 stretched adjacent the first timing belt 38 in parallel to the lower guid rails 33, 33a and 33b and further transferred through through the pulley 44, a transmission timing belt 46 stretched upwardly and downwardly and so on to a fourth timing belt 47 stretched adjacent the second timing belt in parallel to the upper guid rails 32, 32a and 32b. The third and fourth timing belts 45 and 47 respectively extend from the left end portion of the second unit 3 to the right end portion of the basic unit 1.

To the third timing belt 45 by means of a fixing device 48 is attached the lower end portion 29d of the body portion 29 of the subrobot 17 and to the fourth timing belt 47 by means of fixing device 49 is attached the upper end portion 29t of the body portion 29 thereof, whereby the rotation of the subrobot drive motor 43 causes the body portion 29 of the subrobot 17 to move in the X directions.

The manipulators 31a and 31b of the main robot 9 and the manipulator 31c of the subrobot 17 are driven by means of rise and fall timing belts 50 and 50c in the Y directions. The rise and fall timing belts 50 and 50c are respectively positioned between the upper end portions 29t and the lower end portions 29d of the body portions 29 and rotationally driven by means of rise and fall drive motors 51 and 51c located on the lower end portions 29d. The pair of upper and lower manipulators 31a and 31b of the main robot 9 are arranged to be moved together with each other in the Y directions and are attached to the timing belt 50 by means of a fixing device, not shown. Similarly, the manipulator 31c of the subrobot 17 is attached to the timing belt 50c by means of a mounting device, not shown. In FIG. 3, references 52 and 52c represent flexible lines for supply of a power to the main robot 9 and the subrobot 17 and transmission and reception of signals.

Figure 5:
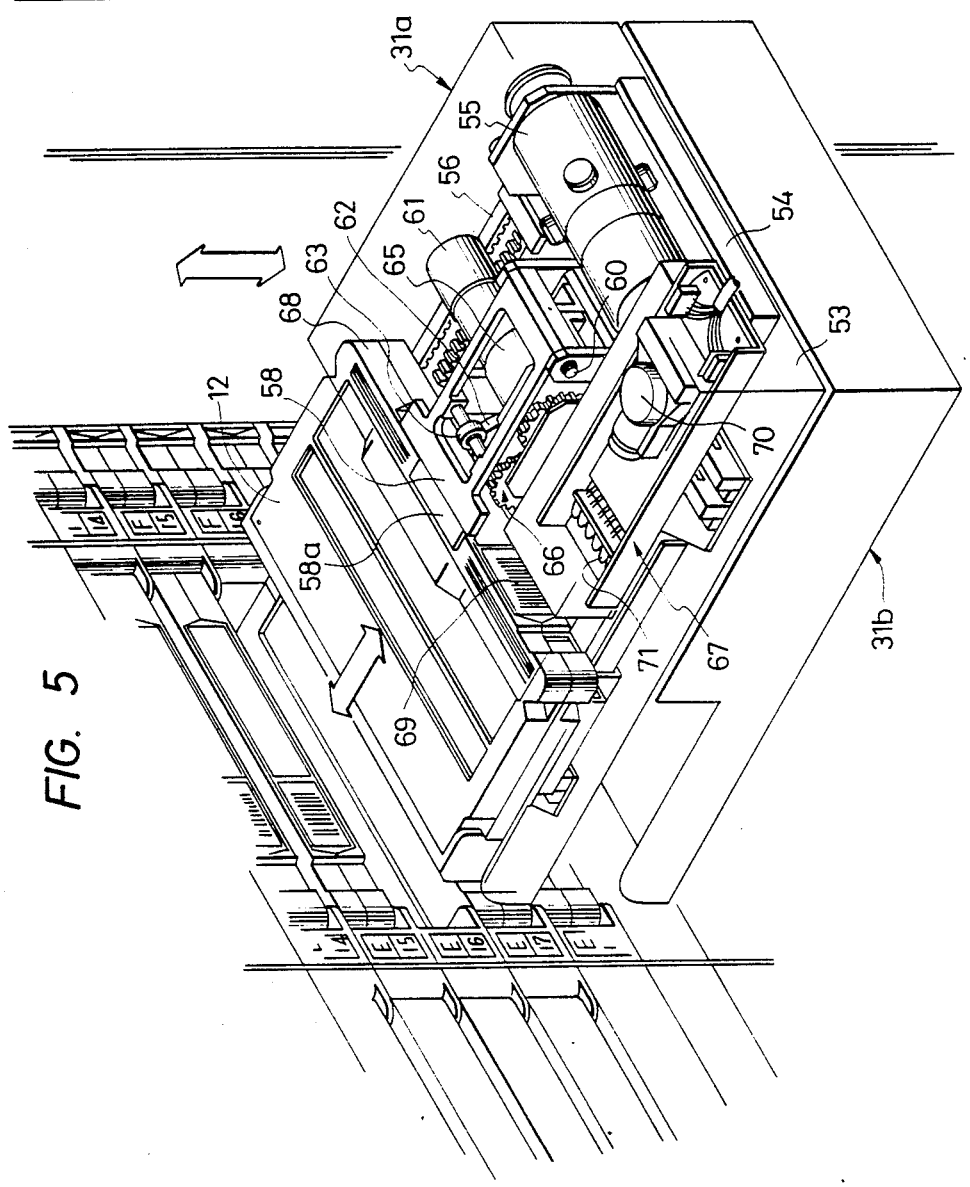
FIG. 5 is a perspective view showing a manipulator.

FIG. 5 shows a detailed arrangement of one of the manipulators 31a and 31b of the main robot 9. The lower manipulator 31b has the same structure as the upper manipulator 31a and further the manipulator 31c of the subrobot 17 has the same structure thereas, and therefore a description will be made in terms of only the upper manipulator 31a and the description for the other manipulators 31b and 31c will be omitted.

As illustrated in FIGS. 5, 6, 7 and 8, on a base plate 53 of the manipulator 31a are guided and supported a chuck base 54 which is driven in the front and rear directions by means of a timing belt 56 rotatable by a chuck base drive motor 55. Numeral 57 represents a fixing device for connecting the chuck base 54 to the timing belt 56. On the chuck base 54 are provided a pair of upper and lower chuck arms 58 and 59 for detachably chucking the cassette 12. The upper chuck arm 58 has at substantial center portion of its end portion a chuck claw 58a and the lower chuck arm 59 has at both sides of its end portion a pair of chuck claws 59a, 59a, so that the cassette is at the three end points chucked thereby. The upper and lower chuck arms 58 and 59 is at its base end portion pivoted by means of a shaft 60 so that they are openable and closable in the up and down direction in response to rotation of a cam 62 coming into contact with cam followers 63 and 64. Rotation of a chuck opening and closing drive motor 61 for driving the cam 62 is transferred through a reduction device 65 and a gear train 66 to the cam 62. To the chuck base 54 is attached a bar code reader 67 which is movable together with the chuck base 54 forwardly and backwardly. The bar code reader 67 has therein a CCD line sensor 70 for reading a bar code 69 indicated on the front surface 68 of the cassette 12 without scanning. The bar code 69 has information representing class numbers and so on registered in a data base and the bar code reader 67 has a LED 71 for illumination of the bar code 69.

Figure 9:
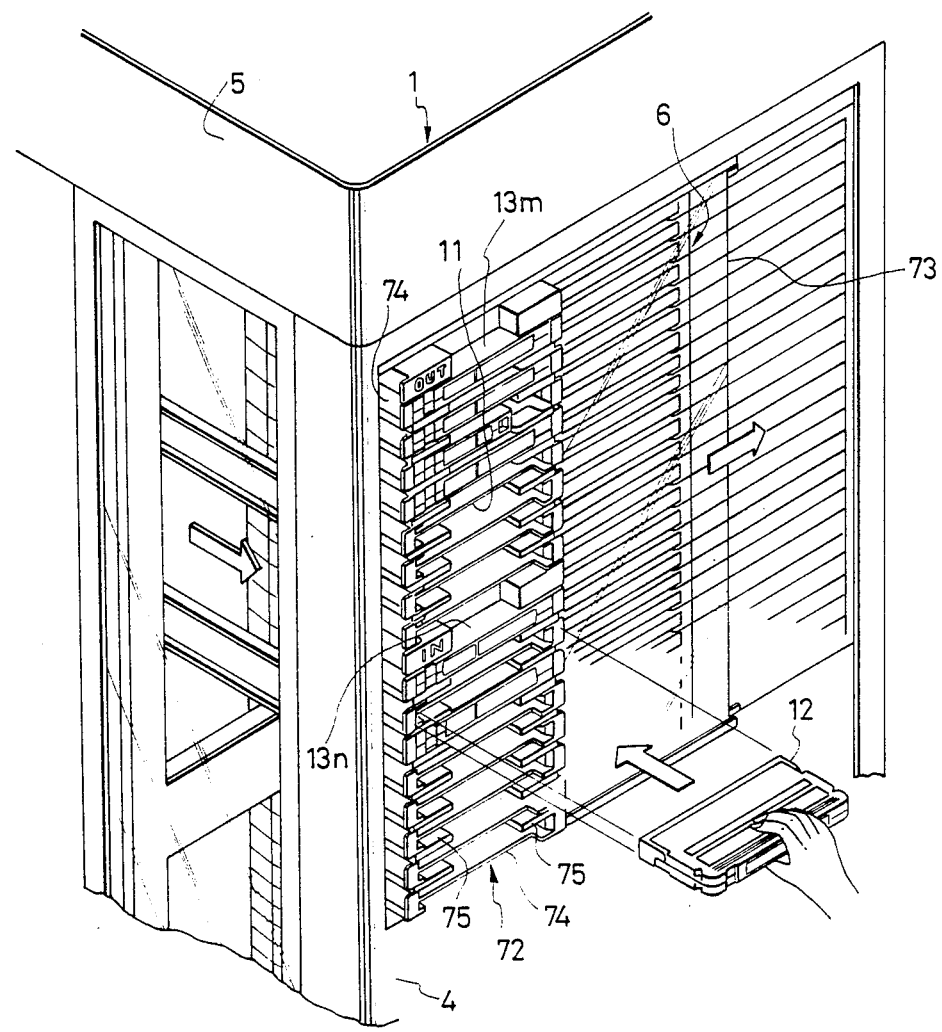
FIG. 9 is a perspective view showing a cassette changing portion.

One block of the fixed cassette storage case 6 of the basic unit 1 is used as a cassette changing portion 72 as illustrated in FIGS. 1 and 9. In the illustration, a left upper portion of the fixed cassette storage case 6 is used therefor so as to always allow exchange of the cassette 12 between the external portion and the fixed cassette storage case 6. When the cassette 12 is exchanged therebetween, as shown in FIG. 9, the cassette changing portion 72 automatically advances and further a glass-made slide door 73 provided independently of the guard glass plate 4 is opened automatically.

Figure 10:
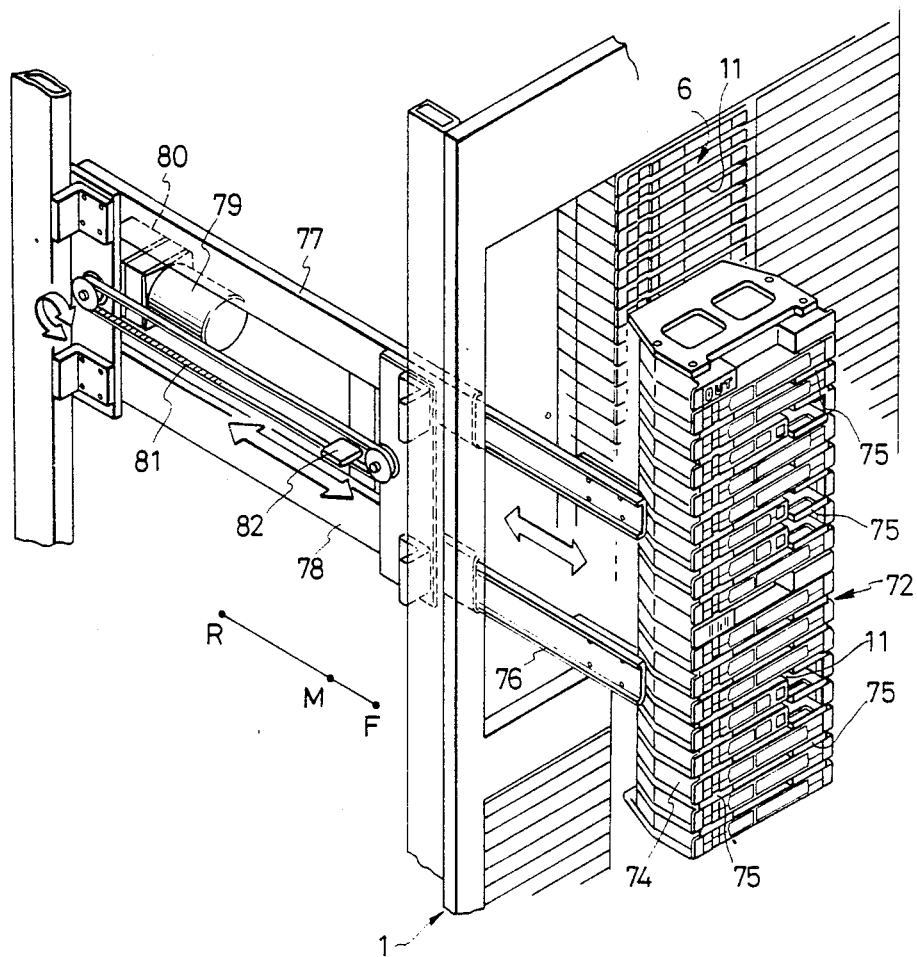
FIG. 10 is an enlarged perspective view of the cassette changing portion.

FIG. 10 shows in detail the cassette changing portion 72 comprising a movable rack case 74 and a mechanism for forward and backward drive thereof. A spacer 75 is interposed between the respective cassette storage portions 13 of the movable rack case 74 so as to easily permit fingering for insertion and discharge of the cassette 12. Thus, in the movable rack case 74, the vertical pitch of the cassette storage portions 13 is great in order to allow the insertion and discharge of the cassette 12 with a finger of a person, while the vertical pitch of the other cassette storage portions 13 and 21 can be set to a minimum since the insertion and discharge of the cassette 12 therefor are effected exclusively by means of the manipulators 31a, 31b and 31c, resulting in increase in the cassette storage capacity.

A ⌐-shaped rack case supporting member 76 is guided by a pair of upper and lower guide rails 77, 78 to be movable forwardly and backwardly and is at its end portion attached to the movable rack case 74. Rotation of a rack case drive motor 79 is transferred through a reduction gear 80 to a timing belt 81 whose rotation results in moving the rack case supporting member 76 and further the movable rack case 74 forwardly and backwardly. Numeral 82 depicts a mounting device for connection between the timing belt 81 and the rack case supporting member 76.

Figures 11, 12:
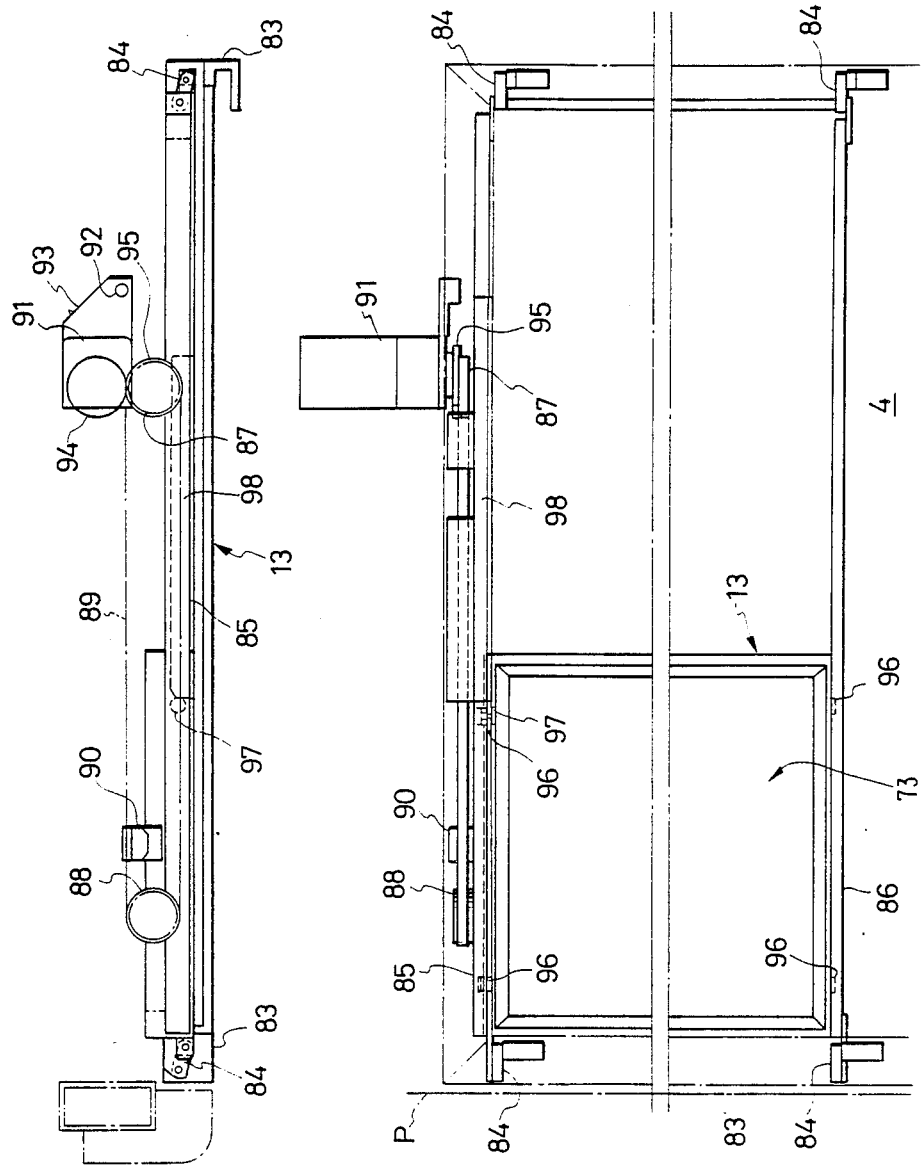
FIG. 11 is a plan view showing a drive system of a slide door.
FIG. 12 is an elevation view of the slide door drive system.

The above-mentioned slide door 73, as shown in FIGS. 11 and 12, is openably and closably guided along a pair of guide rails 85, 86 whose both ends are supported through slide fittings 84 by a frame 83 of the guard glass plate 4. On the upper side guide rail 85 are provided a drive sprocket 87, a driven sprocket 88 and a timing belt 89 rotated thereby, the timing belt 89 being coupled through a mounting device 90 to the slide door 73. A door drive motor 91 for driving the timing belt 89 is provided on a motor bracket 93 pivoted through a pivotal pin 92 on the box 5 body of the basic unit 1 and an output gear thereof is engaged with an input gear 95 which is in coaxial relation to the drive sprocket 87. On the upper and lower edges of the slide door 73 are provided guide rollers 96 which are guided by the guide rails 85 and 86 to be rotationally moved and at the right end portion of the upper edge thereof is provided a cam follower 97. This cam follower 97 is rotationally moved with it being kept to come into contact with a cam plate 98 fixedly secured to the back surface of the guard glass plate 4. This cam plate 98 is formed to have a configuration as shown in FIG. 11 so that the surface of the slide door 73 and the surface of the guard glass plate 4 are on the same plane when the slide door 73 is in the closed state and the slide door 73 is encased at the back surface of the guard glass plate 4 when the slide door 73 is in the open state. That is, when the slide door 73 is moved in the right direction to be opened, the slide door 73 is introduced to the back side by means of the action of the cam plate 98 and this causes the upper and lower guide rails 85 and 86 to be moved backwardly and further causes the motor bracket 93 to be rotated backwardly.

The entire guard glass plate 4 can be rotationally opened forwardly about an axis P shown in FIG. 12 and at this time the output gear 94 and the input gear 95 are released from the engagement state. The door drive motor 91 is appropriately placed in the basic unit box 5 so that the guard glass plate 4 can be smoothly opened and closed.

Figure 13:
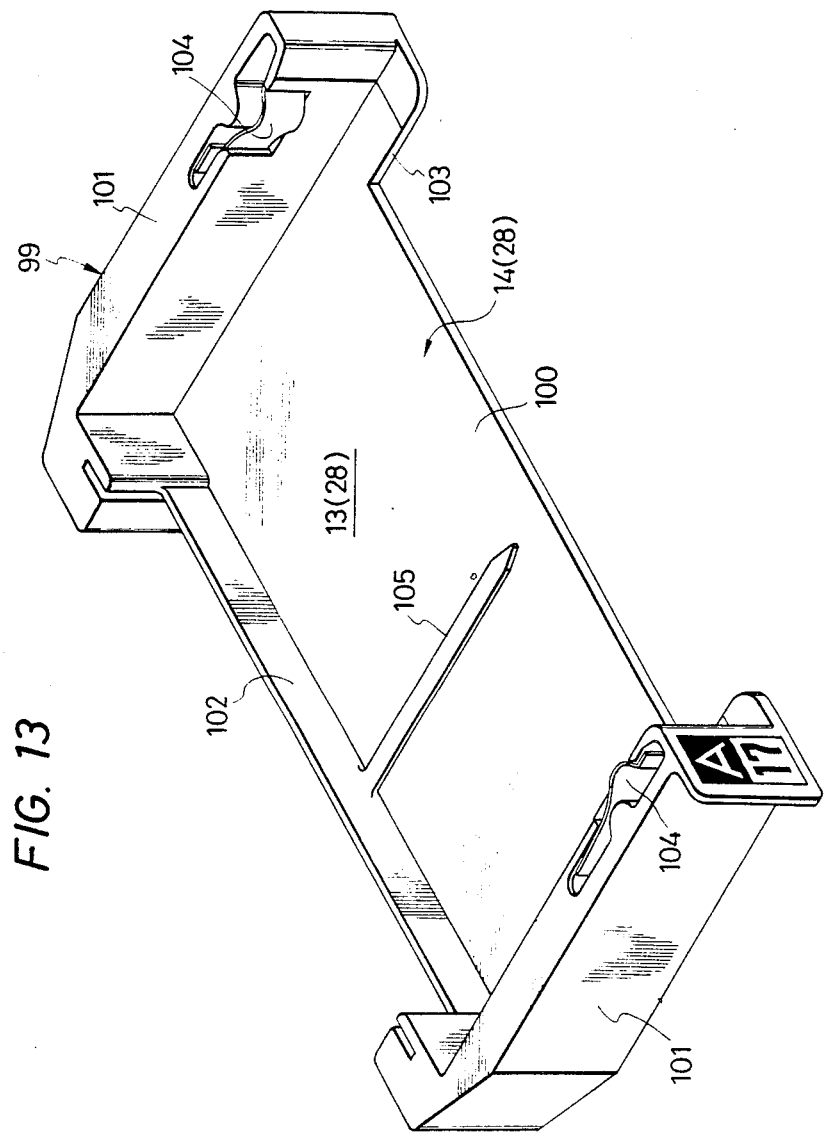
FIG. 13 is a perspective view showing a cassette storage case.
Figure 14:
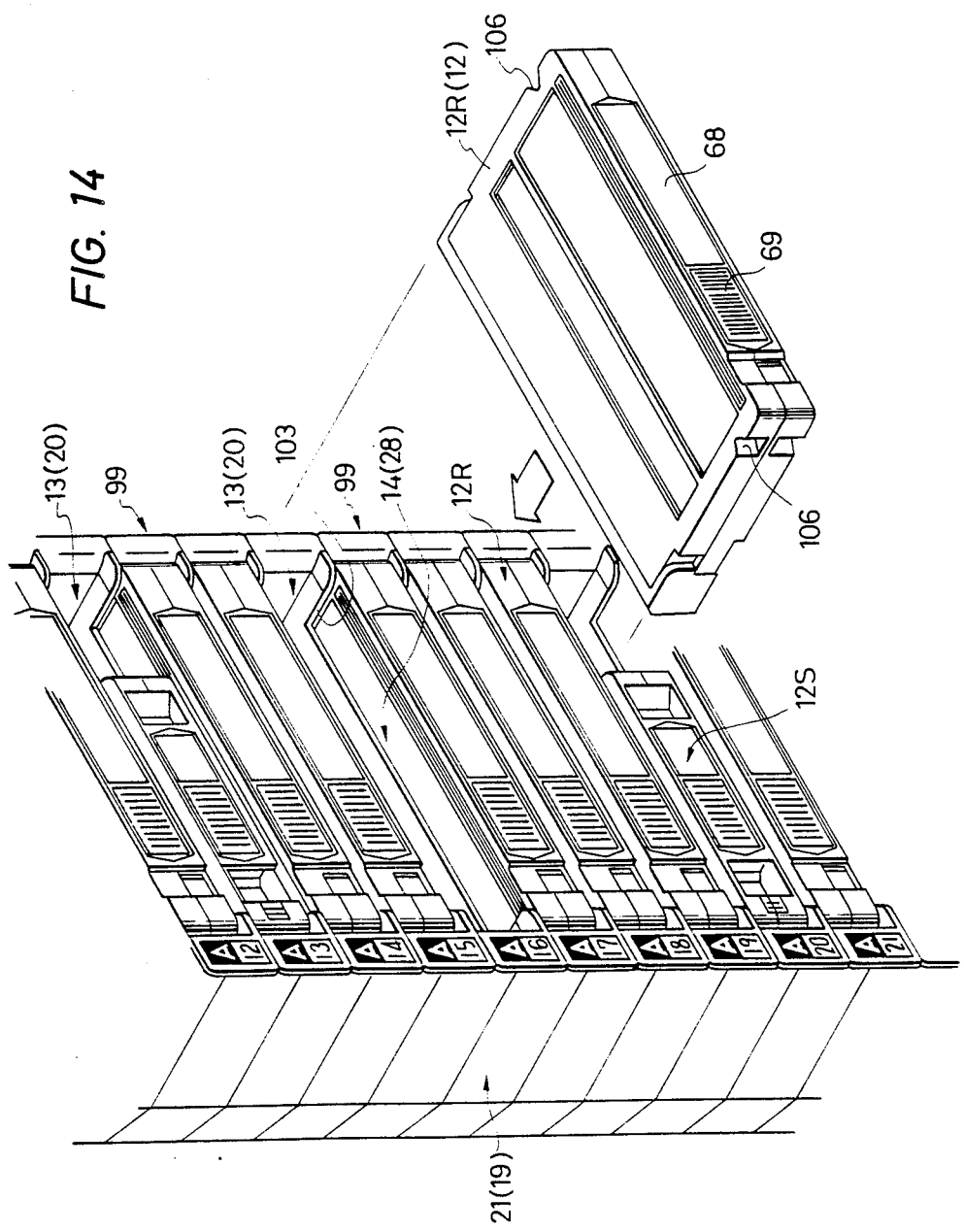
FIG. 14 is a perspective view illustrating a rack of cassette storage cases.

Each rack 99 of the cassette storage portions 13 and 20 of the fixed cassette storage case 6 and the rotatable type cassette storage cases 16a and 16b is constructed as shown in FIG. 13. The rack 99 is composed of a bottom plate 100, both side plates 101, 101, and a back plate 102 which are integrally made of a synthetic resin, the front side and upper side being opened. As shown in FIG. 14, the racks 99 are piled up so as to form the rack cases 21 and 19 and the bottom plates 100 thereof act as partitions among the cassette storage portions 13 and 20. The front side openings of the racks 99 function as the cassette entrance and exit ports 14 and 28 of the respective cassette storage portions 13 and 20. At the front end portion of each of the bottom plates 100 is provided a notch 103 for surely performing chucking operations of the cassettes 12 by the manipulators 31a, 31b and 31c and a person finger. On the inside surfaces of the side plates 101 and 101 are provided positioning leaf springs 104 and 104. In addition, a protruded strip 105 is formed integrally forwardly and backwardly on a portion of each of the bottom plates 100 which is positioned at a little to the left side from the center thereof.

Figure 15:
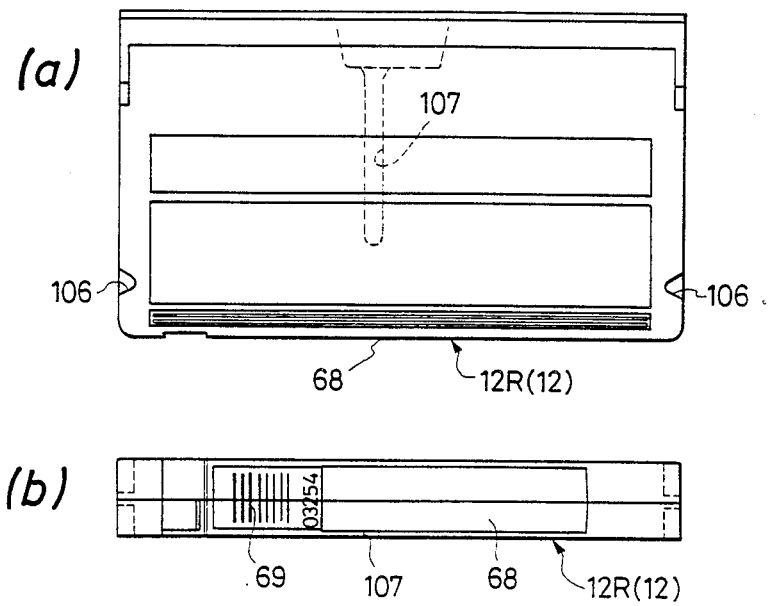
FIG. 15 shows a regular-sized cassette, (a) being a plan view and (b) being en elevation view.
Figure 17:
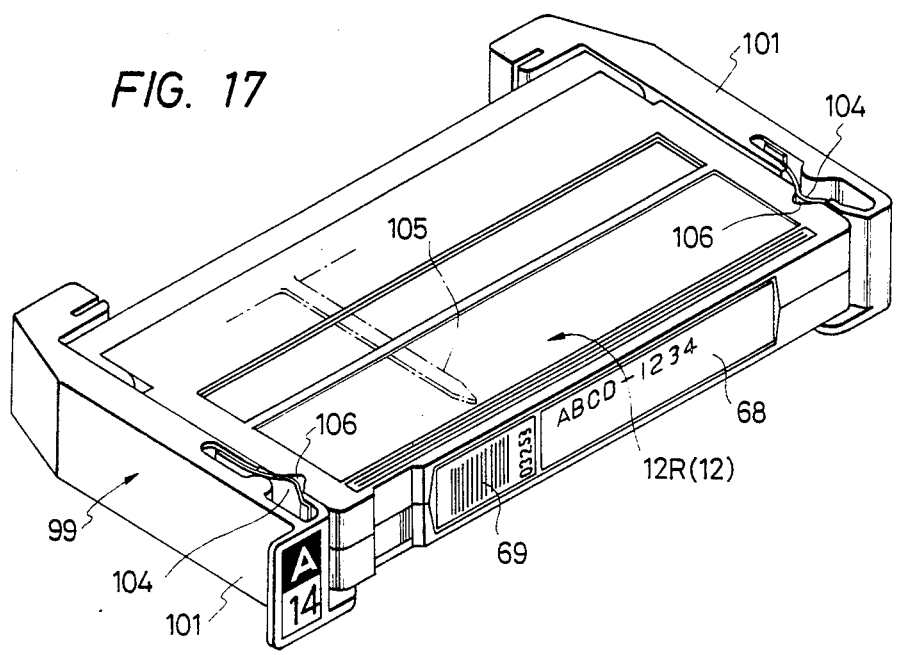
FIG. 17 is a perspective view showing the encasing state of the regular-sized cassette.

The internal space of each of the racks 99, i.e., the space of each of the cassette storage portions 13, 20, as shown in FIGS. 13 and 14, has a size suitable to encase a regular-sized cassette 12R (12). This cassette 12R, as shown in FIGS. 15 and 17, has at the front surface 68 the bar code 69 and has at both side surfaces notches 106, 106 to be engaged with the positioning leaf springs 104, 104 and further has on its bottom surface a guide channel to be engaged with the protruded strip 105. Thus, the regular-sized cassette 12R, as shown in FIG. 17, is restricted in the left and right movements with the side plates 101, 101 and the protruded strip 105 and positioned in the forward and backward directions by means of the positioning leaf springs 104, 104, resulting in location thereof in the cassette storage portions 13, 20. At this time, the front surface 68 of the regular-sized cassette 12R is at the substantially same position as the front end surface of the rack 99 and this position is the cassette storage reference position. Here, the positioning leaf springs 104, 104 function to prevent the cassette 12R from dropping down and the protruded strip 105 acts as means for preventing the cassette 12R from being in reverse inserted into the cassette storage portion 13 or 20 by means of engagement with the guide channel 107 (as well as in a small-sized cassette which will be described hereinafter).

Figure 16:
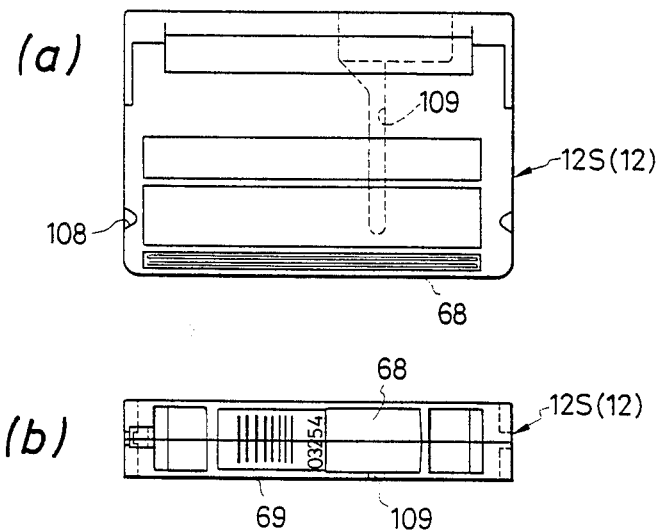
FIG. 16 shows a small-sized cassette, (a) being a plan view and (b) being a elevation view.
Figure 18:
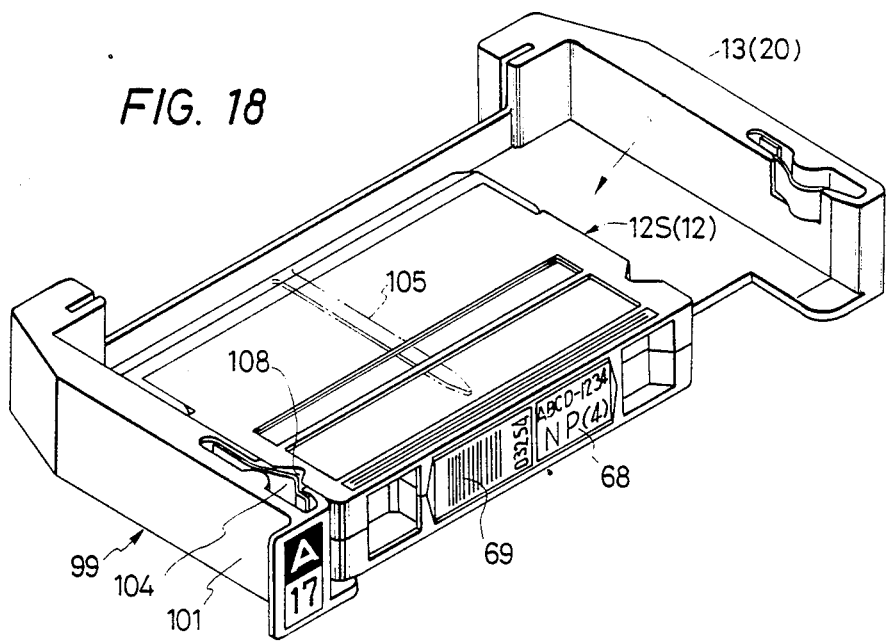
FIG. 18 is a perspective view showing the encasing state of the small-sized cassette.

It is also possible to encase small-sized cassettes 12S (12) in the cassette storage portions 13, 20. This cassette 12S, as shown in FIGS. 16 and 18, has indication of a bar code 69 at the front surface 68 and has at the left side surface a notch 108 to be engaged with the positioning leaf spring 104 and has on the bottom surface a guide channel 109 to be engaged with the protruded strip 105. Therefore, the small-sized cassette 12S, as shown in FIG. 18, is restricted in the left and right movements by means of the left side plate 101 and protruded strip 105 of the rack 99 and positioned in the forward and backward directions by means of the positioning leaf spring 104 so as to be encased in the cassette storage portion 13 or 20 with an excessive space being remained. The notch 108 is formed at the same position as the regular-sized cassette 12R and hence the front surface of the small-sized cassette 12S is positioned to be the cassette storage reference position similarly.

Figure 19A:
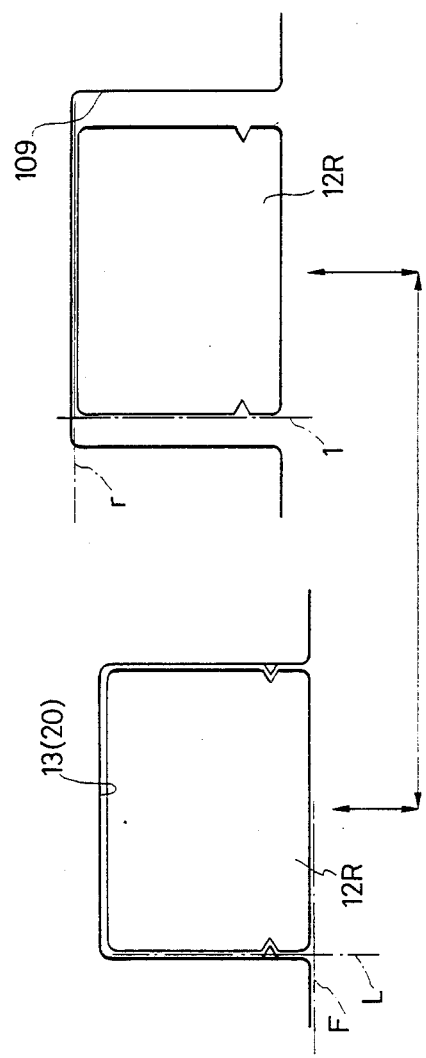
FIG. 19 is plan views showing schematically the cassette encasing states (a & b) in principle.
Figure 19B:
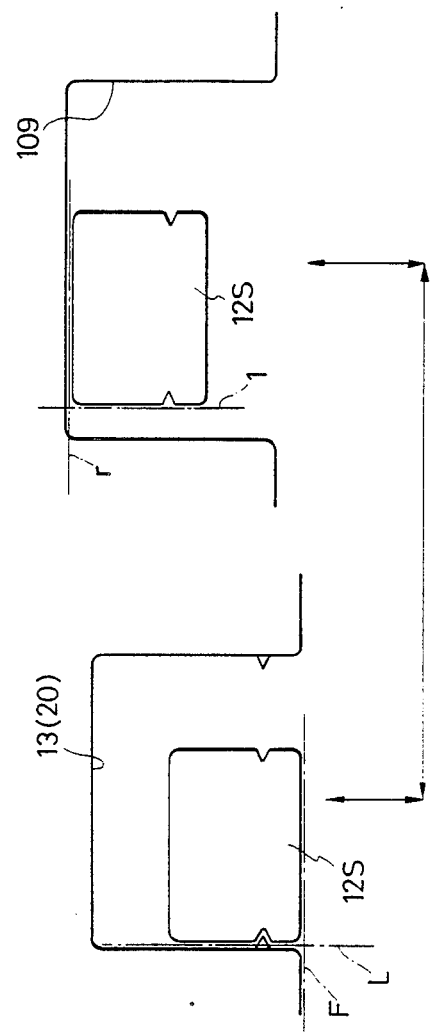

As described above, both size cassettes 12R and 12S, as shown in FIG. 19, are respectively stored in the cassette storage portions 13, 20 with the left side and front side thereof with respect to the cassette storage portions 13, 20 being set as reference positions L and F and therefore the bar codes 69 of regular- and small-sized cassettes 12R, 12S are at the same position. On the other hand, when cassettes are to be encased in insertion portions 109 of the VTR set 7, as shown in FIG. 19, the left sides and rear sides of the cassettes 12R and 12S are set to reference positions 1 and r.

Figure 20:
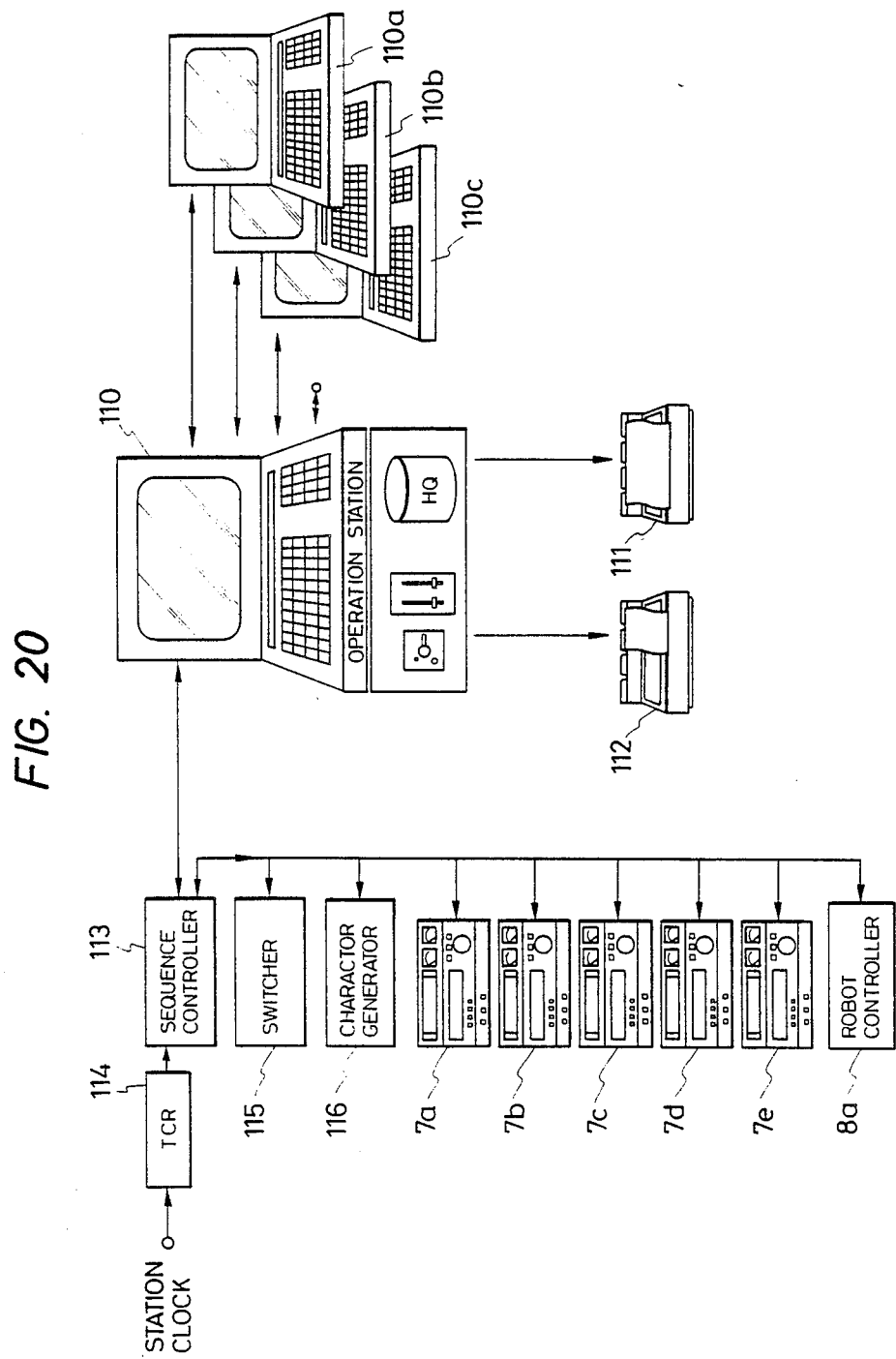
FIG. 20 is a block diagram showing a control system for the entire system.

FIG. 20 is a control block diagram of an automatic video tape cassette exchanging system. In an operation station 110 are inputted the data base, program, edit program, time difference broadcasting program and so on which are indicated on its display portion. The data is printed out by means of printer 111 and a bar code label and so on are produced by a label printer 112 and the operation station 110 is coupled through a network to operation stations 110a, 110b of remote places. The operation station 110 supplies and receives signals to and from a sequence controller 113. The sequence controller 113, for sequential control, is coupled to an image switching device (switcher) 115, a character generator 116, the video decks 7a to 7e of the VTR set 7 and robot controller 8a encased in the controller box 8.

Figure 21:
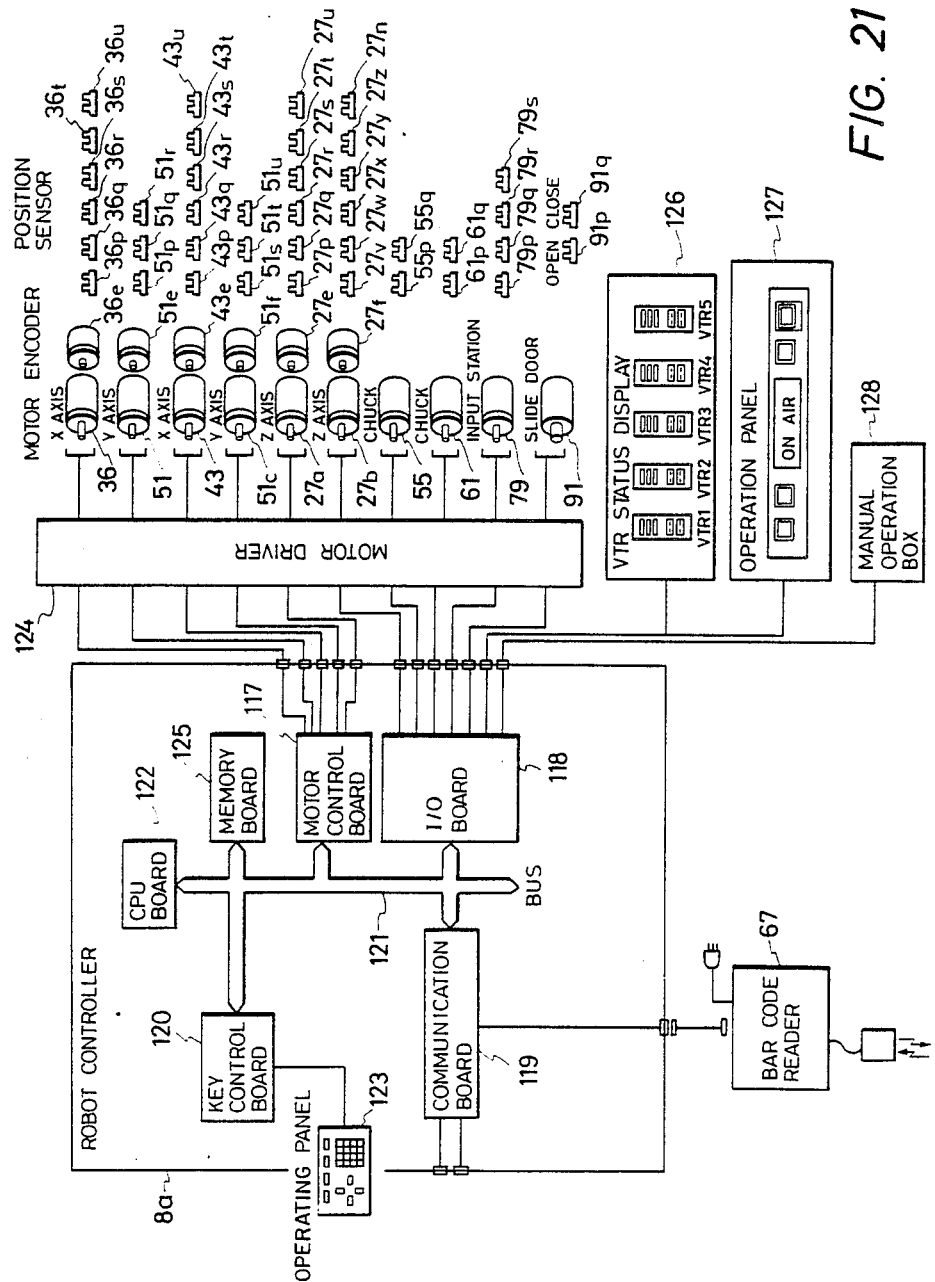
FIG. 21 is a block diagram illustrating a control system of a robot controller.

The robot controller 8a, as shown in FIG. 21, has a memory board 125, a motor control board 117, an I/0 board 118, a communication board 119, a key control board 120 and a CPU board 122 coupled through a bus 121 thereto. To the key control board 120 is coupled an operating panel 123 and to the communication board 119 is coupled the bar code reader 67.

The robot controller 8a is coupled through the motor control board 117 and the I/0 board 118 to motor divers 124, a VRT status display 126, an operation panel 127 and a manual operation box 128 so as to control them and receive signals therefrom. The motor drivers 124 control rotations of the following motors: (1) main robot drive motor 36 for X-direction movement and positioning of main robot 9; (2) main robot rise and fall drive motor 51 for Y-direction movement and positioning of main robot 9; (3) subrobot drive motor 43 for X-direction movement and positioning of subrobot 17; (4) subrobot rise and fall drive motor 51c for Y-direction movement and positioning of subrobot 17; (5) case drive motor I 27a for rotation and positioning of rotational angle θ of rotatable type cassette storage case 16a of first addition unit 2; (6) case drive motor II 27b for rotation and positioning of rotational angle θ of rotatable type cassette storage case 16b of second addition unit 3; (7) chuck base drive motor 55 for advance movement and positioning of manipulators 31a, 31b and 31c; (8) chuck opening and closing drive motor 61 for opening and closing movement of manipulators 31a, 31b and 31c; (9) rack case drive motor 79 for forward and backward movement (of movable rack case 74) in cassette changing portion 72; and (10) door drive motor 91 for opening and closing movement of slide door 73 in front of cassette changing portion 72.

Of these motors, the robot drive motors 36 and 43, rise and fall drive motors 51 and 51c and case drive motors 27a and 27b respectively have encoders 36e, 43e, 51e, 51f, 27e, 27f so as to allow detection of the rotational positions thereof. Furthermore, position sensors of detecting the positions of bodies driven by the motors other than the door drive motor 91 are provided at predetermined positions. More specifically, the X-direction position of the main robot 9 is detected by means of position sensors 36p, 36q, 36r, 36s, 36t, 36u and the Y-direction position thereof is detected by position sensors 51p, 51q, 51r. Similarly, the X-direction position of the subrobot 17 is detected by means of position sensors 43p, 43q, 43r, 43s, 43t, 43u and the Y-direction position thereof is detected by position sensors 51s, 51t, 51u. Furthermore, the θ-direction positions of the first and second addition units 2 and 3 are detected by means of position sensors 27p, 27q, 27r, 27s, 27t, 27u and position sensors 27v, 27w, 27x, 27y, 27z, 27n. In addition, the positions in the forward and backward directions of the manipulators 31a, 31b, 31c are detected by means of position sensors 55p, 55q and the positions on the opening and closing movements thereof are detected by means of position sensors 61p, 61q, respectively. Furthermore, the forward and backward position of the movable rack case 74 is detected by means of position sensors 79p, 79q, 79r, 79s. the opening and closing movement of the slide door 74 is effected under control of the robot controller 8a, while the opening and closing is performed in response to manual operations of an open switch 91p or a close switch 91q.

A description will hereinbelow be made in terms of the normal automatic exchanging operations of the main robot 9 and the subrobot 17 controlled by the above-mentioned control means.

Figure 22:
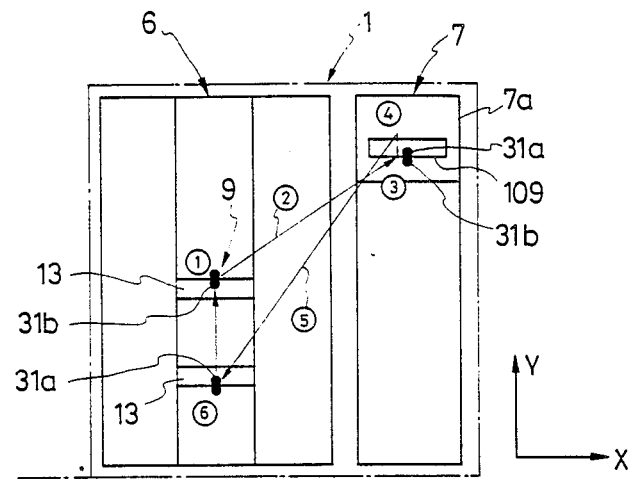
FIG. 22 is a principle diagram showing the moving locus of the main robot.

The main robot 9 normally reciprocates between between the fixing type cassette storage case 6 and the VTR set 7 and performs the cassette exchanging works with the pair of upper and lower manipulators 31a and 31b taking over a portion of the work. As illustrated in FIG. 22, in a first step ①, in order to pick out a cassette 12, to be used subsequently, from a selected one of the cassette storage portions 13 of the fixing type cassette storage case 6, the main robot 9 moves in the X-Y directions so that the lower side manipulator 31b is positioned to face the cassette storage portion 13. The chuck arms 58 and 59 of the lower side manipulator 31b chuck and take out the next used cassette 12 in the cassette storage portion 13 in accordance with a series of operations. In a second step ②, the main robot 9 moves in the X-Y directions to cause the cassette 12 to be transferred to the VRT set 7. In a third step ③, as shown in (1) of FIG. 23, the main robot 9 is positioned in the X-Y directions so that the upper side manipulator 31a faces the cassette insertion portion 109 of a video deck (for example, 7a) for encasing the use-ended cassette 12. Thereafter, the chuck arms 58 and 59 of the upper side manipulator 31a advance and are opened and closed to hold the cassette 12 and go back so as to derive the cassette 12 from the cassette insertion portion 109 ((2) and (3) of FIG. 23).

Figure 23:
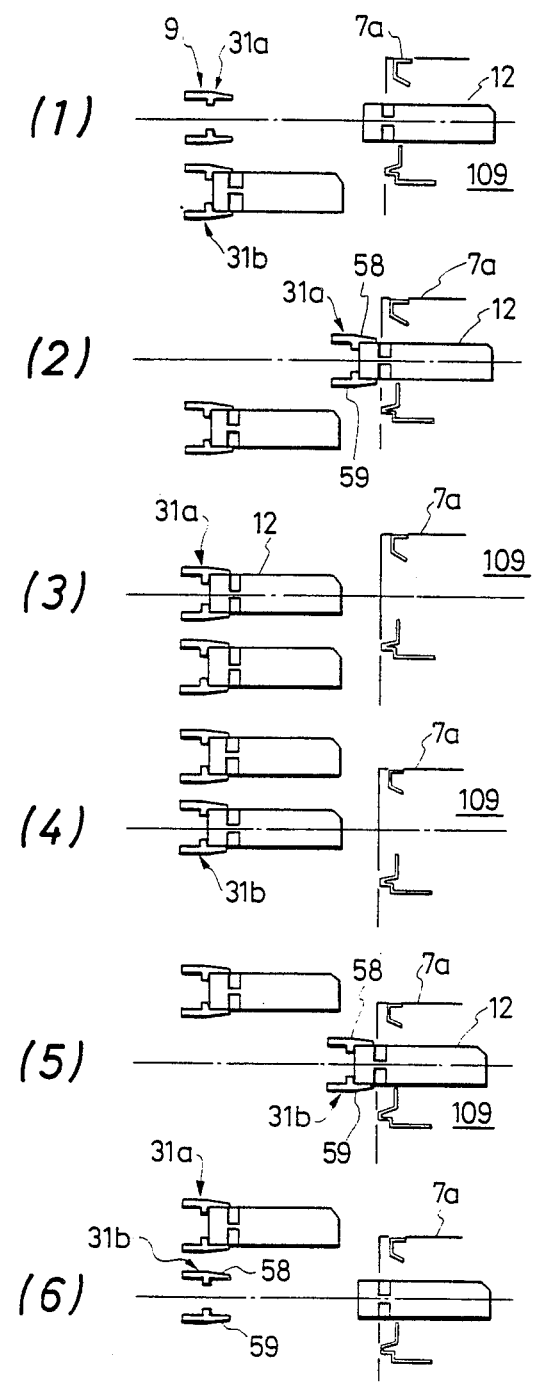
FIG. 23 (1)-(6) is an illustration for describing the operation for inserting and discharging of a cassette into and from a VTR set by the pair of upper and lower manipulators.

In a fourth step ④, in order to insert into the video deck 7a the cassette 12 held by the lower side manipulator 31b, the main robot 9 slightly moves upwardly so that the manipulator 31b is positioned to be in the opposed relation to the cassette insertion portion 109 ((4) of FIG. 23). The chuck arms 58 and 59 of the lower side manipulator 31b advance and open after insertion of the cassette 12 into a predetermined position of the cassette insertion portion 109 and then go back ((5), (6) of FIG. 23).

In a fifth step ⑤ after the cassette exchange on the VTR set 7, the main robot 9 moves in X-Y directions in order to transfer the use-ended cassette 12 to a selected cassette storage portion 13 of the fixing type cassette storage case 6. In a sixth step ⑥, the main robot 9 is positioned in the X-Y directions so that the upper side manipulator 31a faces the selected cassette storage portion 13. The chuck arms 58 and 59 of the upper side manipulator 31a return the cassette 12 to the cassette storage portion 13 in accordance with a series of operations and then go back to the original position. Thereafter, the main robot 9 moves in the X-Y directions so as to return to the first step 1 state. Since it is better that the moving distance of the main robot 9 from the sixth step 6 to the first step 1 is as short as possible, in the sixth step, the cassette storage portion 13 with a space to which the cassette 12 returns may be selected to be as close to the cassette storage portion 13 from which the cassette 12 is derived in the first step 1 as possible.

As described above, the upper side manipulator 31a of the main robot 9 functions to take out the cassette 12 from the VTR set 7 and returns it to the fixed cassette storage case 6 and, on the other hand, the lower side manipulator 31b functions to take out the cassette 12 from the fixed cassette storage case 6 and to insert it into the VTR set 7. As a result, the cassette exchanging work of the main robot 9 in the fixed cassette storage case 6 and the VTR set 7 can be successively effected, thereby resulting in shortening the cassette exchanging time. Here, it is also possible that the functions of the upper side and lower side manipulators 31a and 31b are in reverse.

The subrobot 17 normally reciprocates between the rotatable type cassette storage cases 16a, 16b and specific cassette storage portions (which will hereinafter be referred to as intermediate stations) 13m, 13n of the fixed cassette storage case 6 so as to perform the cassette exchanging operation. The intermediate stations, as shown in FIG. 9, are provided at the left side of the fixed cassette storage case 6, i.e., at a place closest to the rotatable type cassette storage cases 16a, 16b and comprises an "OUT" intermediate station 13m and an "IN" intermediate station 13n. The subrobot 17 has only the manipulator 31c and operates as shown in the left side of FIG. 24. In a first step ①', a cassette 12 to be used next is taken out from a selected cassette storage portion 20 of the rotatable type cassette storage cases 16a, 16b. At this time, until the subrobot 17 reaches a predetermined position in the X-Y directions, the rotatable type cassette storage cases 16a, 16b are rotated to a predetermined position to determine the θ position. In the first step ①', as described above, the cassette 12 is picked up from the cassette storage portion 20 which is determined on the basis of the three coordinate data, i.e., X, Y, θ. Thereafter, in a second step ②', the cassette 12 is carried toward the "OUT" intermediate station 13m.

In a third step ③', the cassette 12 is inserted into the "OUT" intemediate station 13m, and in a fouth step ④', a cassette 12 is derived from the "IN" intermediate station 13n, and in a fifth step ⑤', the cassette 12 is carried toward a selected cassette storage portion 20 of the rotatable type cassette storage cases 16a, 16b. In a sixth step ⑥', the cassette 12 is inserted into the specific cassete storage portion 20 determined in accordance with X, Y, and θ.

The above-described operation of the subrobot 17 is effected before it is required to insert the cassette 12 in the rotatable type cassettes storage cases 16a, 16b into the VTR set 7. In this case, as shown in the right side of FIG. 24, the main robot 9 takes out the cassette 12, which was carried to the "OUT" intermediate station 13m by means of the subrobot 17, and sets it to the VTR set 7 (①→④ in FIG. 24) and picks up the use-ended cassette 12 from the VTR set 7 and returns it to the "IN" intermediate station 13n (③→⑥ in FIG. 24). The cassette 12 backed to the "IN" intermediate station 13n, as described above, is taken out by the subrobot 17 and then brought back to the rotatable type cassette storage cases 16a, 16b.

Figure 24:
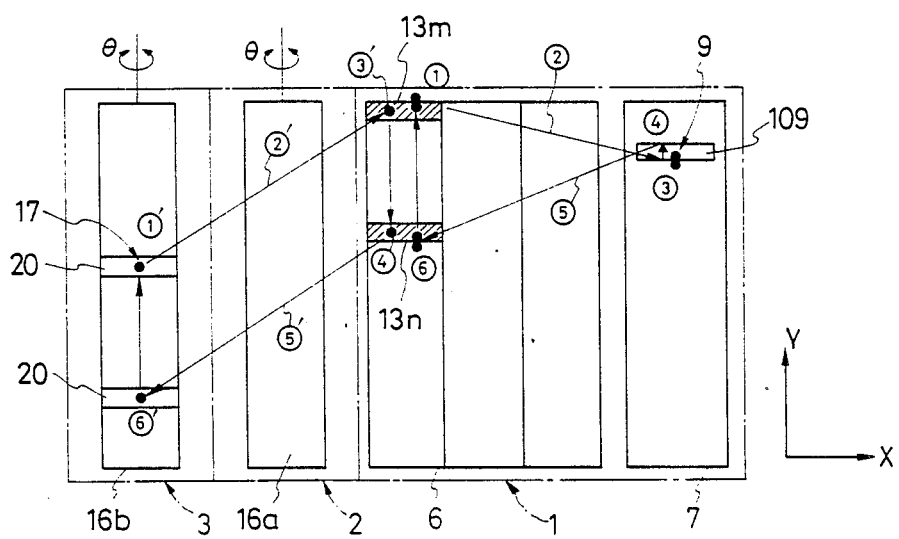
FIG. 24 is a principle diagram showing moving loci of the robots on cooperative works of the main robot and subrobot.

As described above, normally, the cassette exchange between the rotatable cassette storage cases 16a, 16b and the VTR set 7, as shown in FIG. 24, is performed in accordance with a path of ①'→②'→③'→①→②→③→④ and a path of ③→④→⑤→⑥→④'→⑤'→⑥'.

In case that the main robot 9 or the subrobot 17 malfunctions, the cassette exchanging system of this embodiment is arranged such that one robot can compensate for the other robot. This compensating function will be described hereinbelow.

The failures of the main robot 9, for example, includes faulty movement of the main robot 9 in the X-Y directions, faulty positioning of the main robot 9 in the X-Y directions, poor chuck function, faulty bar code reader 67 and so on which may be deteected by means of encoders 36e, 57e, position sensors 36p, 51p, 55p, 61p, excessive current detectors of the motors 36, 51 55, 61 and so on, the presence or absence of abnormality thereof being decided in the robot controller 8a. The failures of the subrobot 17 may includes the similar cases and be similarly decided in the robot controller 8a.

Figure 25:
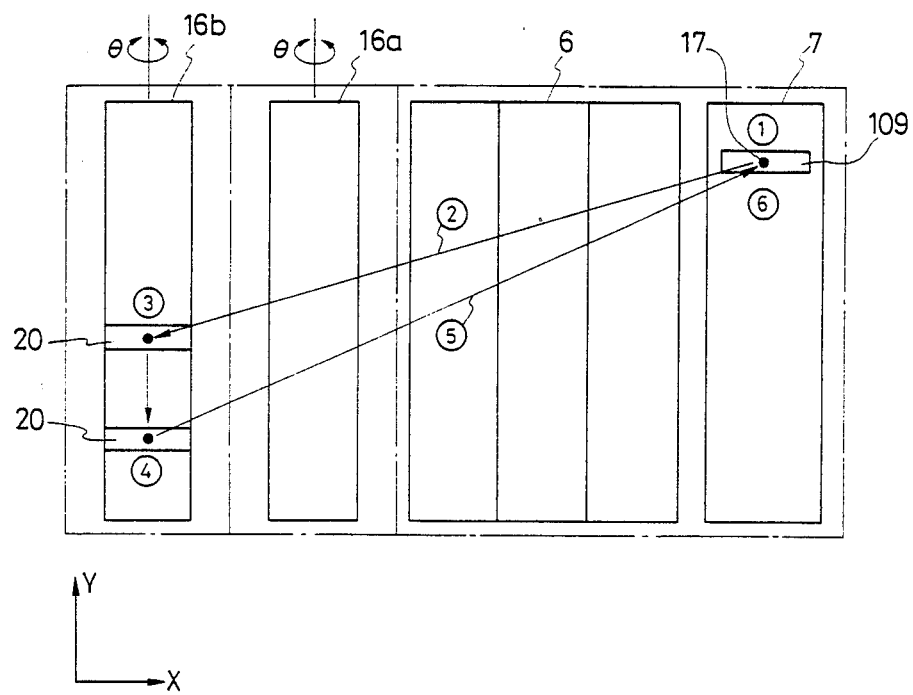
FIG. 25 is a principle diagram showing a moving locus of the subrobot.

When the control means has decided that the main robot is not in the normal state (detailed in FIG. 26), control is performed such that the main robot 9 backs to the right side of the robot movement space 10 and the subrobot 17 is set to be movable over the overall robot movement spaces 10, 10a and 10b so that, as shown in FIG. 25, only the subrobot 17 performs the cassette exchange for the overall regions. More specifically, in a first step ①, the subrobot 17 takes out a use-ended cassete 12 from a selected cassette insertion portion 109 of the VTR set 7, and in a second step ②, this is transferred to the selected empty cassette storage portion 13, 20 of all of the cassette storage cases 6, 16a, 16b, and in a third step ③, the cassette is inserted into the cassette storage portion 13, 20 for returning. In a fourth step ④, the subrobot 17 moves toward the cassette storage portion 13, 20 in which a cassette 12 to be used subsequently is encased and takes out it. Therafter, in a fifth step ⑤, the subrobot 17 starts to move toward the cassette insertion portion 109, and in a sixth step ⑥, the cassette 12 is inserted into the cassette insertion portion 109, resulting in completion of a series of processes.

As described above, when the main robot 9 is in an abnormal state, only the subrobot 17 with the single manipulator 31c performs the overall cassette exchanging operation and therefore the subrobot 17 is required to go and return between the VTR set 7 and the cassette storage cases 6, 16a and 16b during a time period from the taking-out of the use-ended cassette 12 from the VTR set 7 to insertion of the next used cassette 12 thereinto, resulting in taking a long time. However, this system has an advantage in that the cassette exchange can be continued without stopping the system irrespective of abnormality of the main robot 9.

When the control means has decided that the subrobot 17 is not in the normal state, the subrobot 17 is retreated to the left end portion of the robot movement space 10b and the main robot 9 is set so as to be movable over the overall robot movement spaces 10, 10a and 10b to perform the cassette exchange for all the regions. In this case, while the main robot 9 basically operates as well as in the case of FIG. 22, the movement range thereof results in covering the robot movement spaces 10a and 10b of the first and second addition units 2 and 3. Thus, irrespective of abnormality of the subrobot 17, the cassette exchange can be continued without stopping the system.

In case that one of the pair of the upper and lower manipulators 31a and 31b of the main robot 9 malfunctions, the cassette exchange system of this embodiment can compensate therefor. This compensating function will be described hereinbelow. The failures of the manipulators 31a and 31b includes faulty chuck function, faulty detection of the bar code and so on, and more specifically the faulty chuck function being, for example, faulty forward and backward drive of the chuck base 54 owing to failure of the chuck base drive motor 55 or the like, faulty opening and closing drive of the chuck arms 58, 59 due to failure of the chuck opening and closing drive motor 61, and so on, and the faulty detection of the bar code being, for example, bad attachment position of the bar code reader 67 and failure of parts thereof. These failures can be detected by means of position sensors 55p, 61p and so on and the excessive current detection of the motors 55, 61 and the presence or absence thereof is determined in the robot controller 8a.

When the decision of the control means is that one manipulator (for example, the upper side manipulator) 31a is not in the normal condition, the other manipulator (for example, the lower side manipulator) 31b is controlled so as to perform the cassette exchanging operation by itself. Therefore, while the main robot 9 is normally controlled so as to perform the processes shown in FIG. 22, when resulting in the decision that the upper side manipulator 31a malfunctions, the upper side manipulator 31a is not used but only the lower side manipulator 31b is used and the movement locus of the main robot 9 is controlled so as to be coincident with that of the subrobot 17 of FIG. 25 (provided that the moving range of the main robot is basically limited to within the robot moving space 10 of the basic unit 1).

Figure 26:
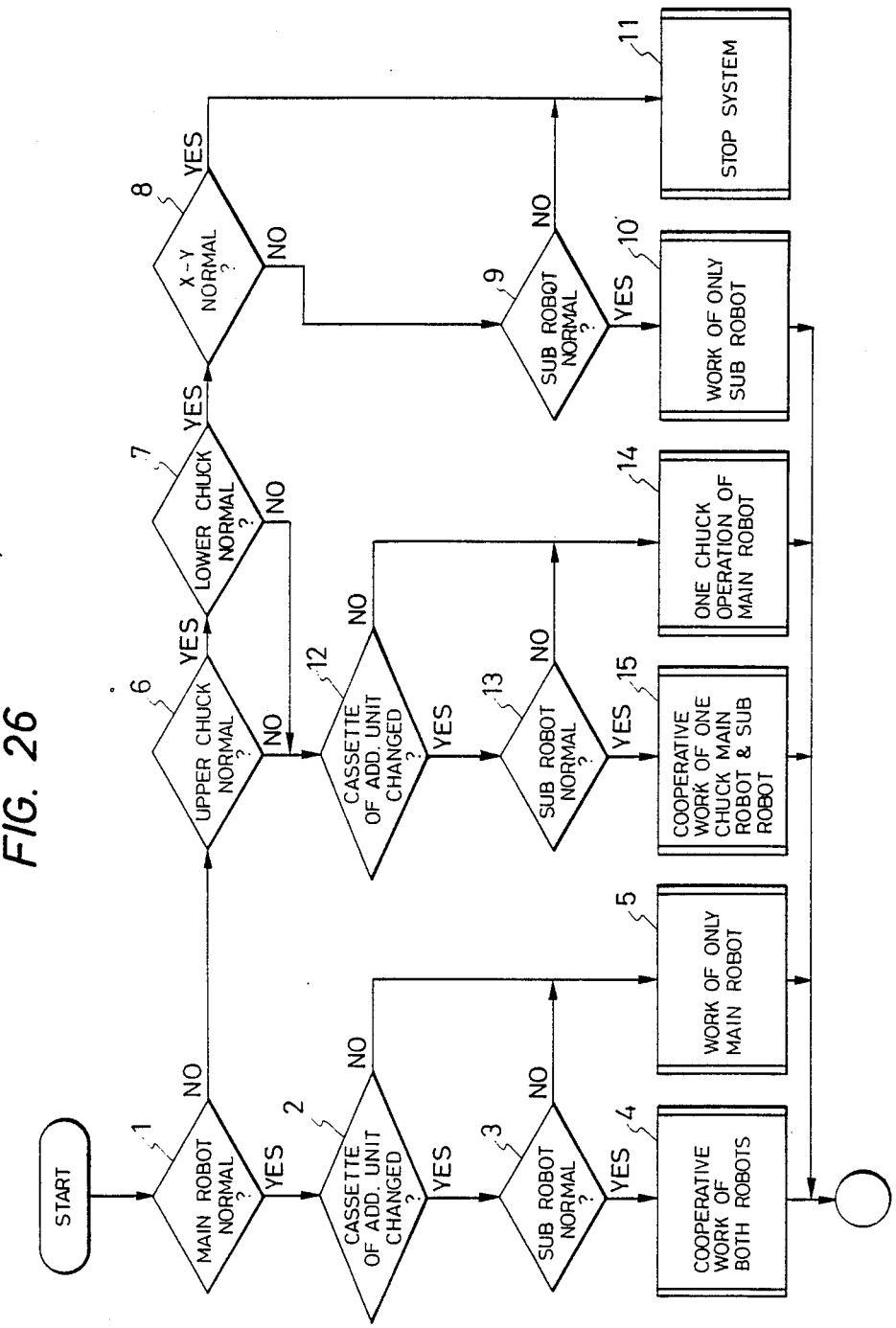
FIG. 26 is a flow chart showing the control procedure of the entire system.

FIG. 26 is a flow chart showing detailed control procedures for the compensating functions between the main robot 9 and the subrobot 17 and the compensating functions between the manipulators 31a and 31b. In a step 1, a decision is made in order to check whether the main robot 9 is in the normal state or not, and in a step 2, a decision is made regarding whether the cassette exchange is required between the addition units 2, 3 and the VTR set 7, and in a step 3, a decision is made regarding whether the subrobot 17 is in the normal state or not. When resulting in the decisions that the main robot 9 and the subrobot 17 are in the normal states respectively and the the cassette exchange is required therebetween, a step 4 is executed to effect the above-mentioned cooperative works of the both robots 9 and 17. On the other hand, when the main robot is in the normal condition but the cassette exchange for the addition units 2, 3 is not required or the subrobot 17 is not in the normal state, a step 5 is executed so as to perform the previously described processes by only the main robot 9.

In the step 1, in the case that the main robot 9 is not in the normal state, in steps 6, 7 and 8, the cause thereof is checked. When the upper side manipulator (upper chuck) 31a and the lower side manipulator (lower chuck) 31b are respectively in the normal states and when the X-Y movement of the main robot 9 is not in the normal condition, a step 9 is executed to check whether the subrobot 17 is in the normal condition. When it is in the normal state, a step 10 follows to perform the above-mentioned processes by only the subrobot 17. When in the step 9, the subrobot 17 is not in the normal state or the main robot 9 malfunctions due to cause other than the causes checked in the steps 6, 7 and 8, a step 11 follows to stop the whole system.

When, in the steps 6 and 7, one of the manipulators 31a and 31b is decided to be in the abnormal state and when, in a step 12, the cassette exchange on the addition units 2, 3 is not required, a step 14 is executed to perform the cassette exchange on the main robot 9 by only the other manipulator 31a or 31b. When in the step 12 the cassette exchange on the addition units 2, 3 is required and when in the step 13 the subrobot 17 is in the normal state, in a step 15, the cooperative works of the main robot 9 and the subrobot 17 is effected using only the one manipulator 31a or 31b.

Figure 27:
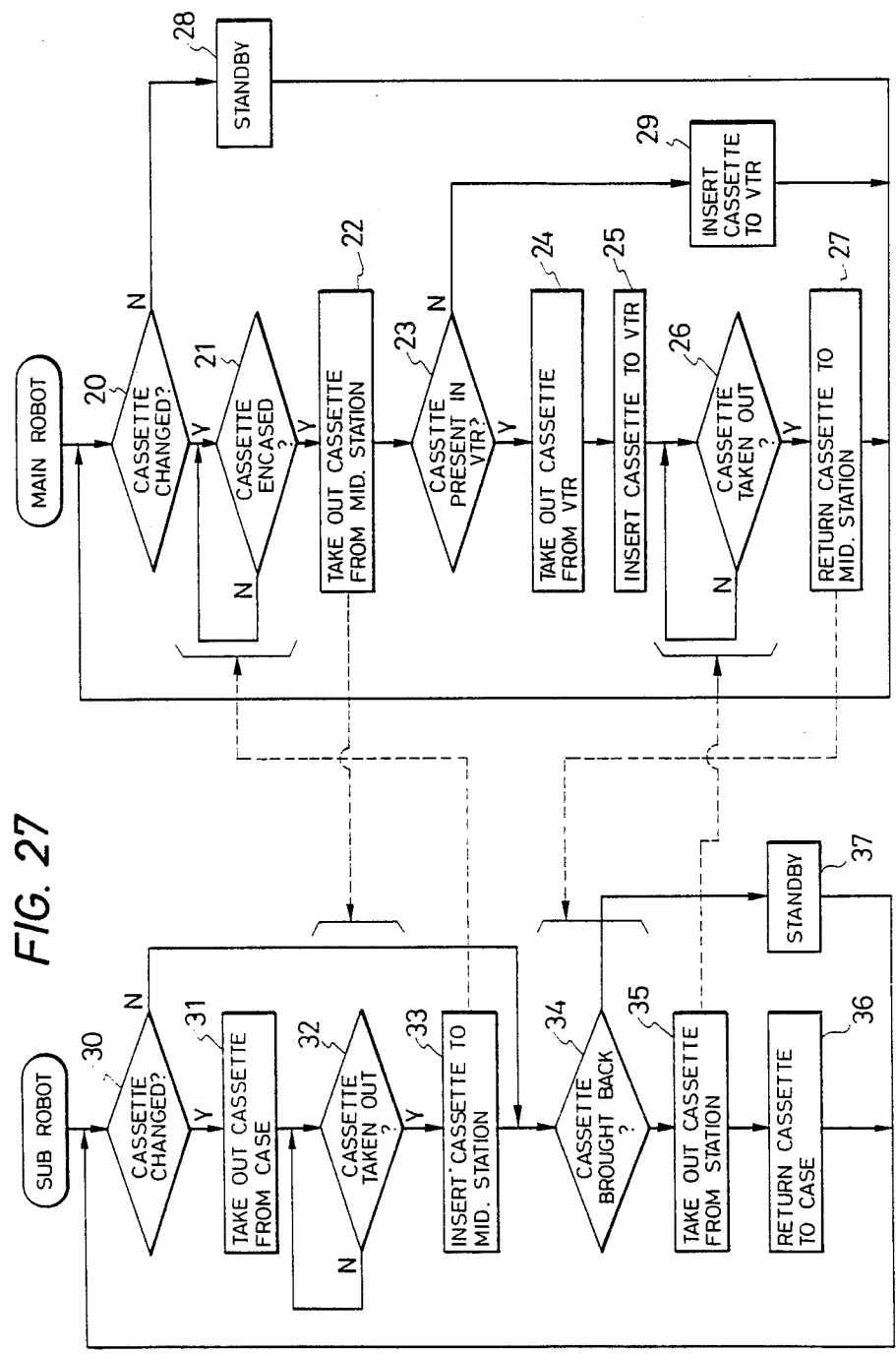
FIG. 27 is a flow chart showing the control procedure on the cooperative works of the main robot and subrobot.

FIG. 27 is a flow chart of the cooperating operation of both robots on the above-mentioned step 4. Although the basic cooperative works of both the robots 9, 17 has been already described with reference to FIG. 24, an additional description will be made hereinbelow with reference to the flow chart of FIG. 27. The main robot 9 operates in accordance with steps 20 through 29. The step 20 is executed to check the presence or absence of requirement of the cassette exchange. If not, the main robot 9 moves to the standby position (step 28) and waits for the cassette exchange requirement. In response to the cassette exchange requirement, the step 21 is executed to check whether the subrobot 17 has encased a cassette 12 into the "OUT" intermediate station 13m. In response to completion of the encasing thereof, the step 22 is executed so as to cause the cassette 12 to be taken out from the "OUT" intermediate station 13m. In the step 23, it is checked whether a cassette 12 is present in a predetermined cassette insertion portion 109 of the VTR set 7. If not, the step 29 is executed such that the subrobot 17 inserts the cassette 12 thereinto, and the operational flow returns immediately after the insertion. When in the step 23 the cassette 12 is present in predetermined cassette insertion portion 109 of the VTR set 7, the steps 24 and 25 are executed so as to perform the cassette exchange for the VTR set 7. Subsequently, the step 26 is executed to check whether the subrobot 17 has derived the cassette 12 from the "IN" intermediate station 13n. In response to the extraction of the cassette 12, the step 27 is executed so that the main robot 9 returns the cassette 12 to the "IN" intermediate station 13n and the operational flow returns to the initial step 20.

On the other hand, the subrobot 17 operates in accordance with steps 30 through 37. When, in the step 30, the decision is made that the cassette exchange is not required, control jumps to the step 34. If required, operations of the steps 31 to 33 are performed such that the cassette 12 is taken out from the rotatable type cassette storage case 16a or 16b and transferred and inserted to the "OUT" intermediate station 13m. The step 32 follows to check the operation of the main robot 9. In the step 34, it is checked that the main robot 9 has returned the cassette 12 to the "IN" intermediate station 13n. If not, the step 37 is executed such that the subrobot 17 moves to the standby position, and thereafter the operational flow returns to the initial step 30. If the cassette 12 has been returned thereto, the steps 35 and 36 are executed such that the cassette 12 is derived from the "IN" intermediate station 13n and restored to the rotatable type cassette storage case 16a or 16b, and the operational flow then returns to the step 30.

Figure 28:
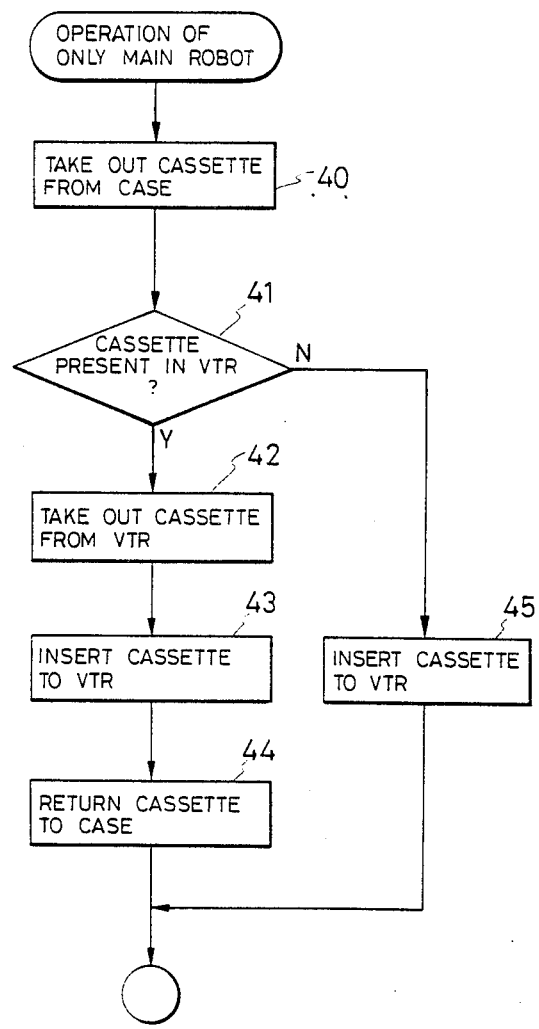
FIG. 28 is a flow chart illustrating the operation of the main robot itself.

FIG. 28 is a flow chart showing the processes of the main robot 9 itself in the above-mentioned step 5. Although this has been already and basically described with reference to FIG. 22, an additional description will be made hereinbelow with reference to the flow chart of FIG. 28 (FIG. 22 shows only the operation in the basic unit 1, but it is also appropriate for the overall regions). Of the steps of the flow chart of FIG. 28, the description of steps 40, 42, 43 and 44 described already with reference to FIG. 22 will be omitted for brevity. In a step 41, it is checked whether a cassette 12 is present in the predetermined cassette insertion portion 109 of the VTR set 7. If absent, control goes to a step 45 in which the cassette 12 is inserted into the VTR set 7, and the operational flow returns immediately after the insertion thereof.

Figure 29:
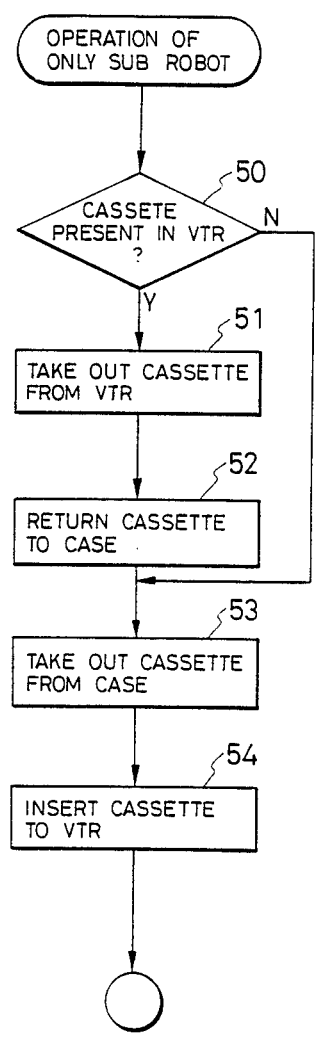
FIG. 29 is a flow chart showing the operation of the subrobot by itself.

FIG. 29 is a flow chart showing the operation of the subrobot 17 by itself in the above-mentioned step 10. Although the basic description has been already made with reference to FIG. 25, an additional description will be made with reference to the flow chart of the FIG. 29 (this is similar to the single-handed work of the main robot 9 using one of the manipulators 31a and 31b in the above-described step 15). Of the steps of the flow chart of FIG. 29, the description of steps 51 through 54 described with reference to FIG. 25 will be omitted for brevity. In a step 50, it is checked that a cassette 12 is present in a predetermined cassette insertion portion 109 of the VTR set 7. If absent, control jumps to the step 53 in which a cassette 12 is taken out from the cassette storage case 16a, or 16b.

Subsequently, control of inserting and unloading of the cassette 12 into and from the VTR set 7 by means of the manipulators 31a, 31b and 31c will be described hereinbelow with reference to FIGS. 30 and 31. Since, as described above, the regular-sized cassette 12R and the small-sized cassette 12S are repectively encased in the cassette insertion portion 109 of the VTR set 7 on the basis of the rear side reference r (FIG. 19), the front surface positions of the both cassettes 12R and 12S are different from each other as shown in (R3) and (S4) of FIG. 30, and further it should be considered that the means for preventing the interference between a front wall 129 of the cassette insertion portion 109 and the chuck arm claws 58a, 59a are different from each other. (R1) to (R3) of FIG. 30 shows the procedure of inserting the regular-sized cassette 12R into the cassette insertion portion 109. That is, the cassette 12R is inserted up to the intermediate position with it being held by means of the pair of upper and lower chuck arm claws 58a and 59a (the state of R1) and the chuck arm claws 58a and 59a are slightly opened at that position so as to release the cassette 12 from the holding (the state of R2) and then the cassette 12R is inserted up to the final position with it being pushed by means of protruded portions 58b, 59b of the chuck arm claws 58a, 59a (the state of R3).

On the other hand, (S1) to (S4) of FIG. 30 show the procedure of inserting the small-sized cassette 12S into the cassette insertion portion 109. That is, the cassette 12S is inserted up to an intermediate position with it being held by the pair of upper and lower chuck arm claws 58a, 59a (the state of S1), and the chuck arm claws 58a, 59a are completely opened at that position so as to release the cassette 12S from the holding and goes back thereafter (the state of S2), and the manipulators 31a, 31b, 31c are entirely and slightly moved upwardly so that the lower chuck arm claw 59a face the front surface of the cassette 12S (the state of S3), and then the cassette 12S is pushed by an end portion of the lower chuck arm claw 59a so as to reach the final position (the state of S4).

(R1) and (R2) of FIG. 31 show the steps of taking out the regular-sized cassette 12R from the cassette insertion portion 109. In this case, the cassette 12R is introduced to a predetermined position by the VTR set 7 and may be taken out therefrom with it being held by the pair of upper and lower chuck arm claws 58a, 59a.

(S1) through (S4) of FIG. 31 show the steps of taking out the small-sized cassette 12S from the cassette insertion portion 109. The cassette 12S is initially introduced to a predetermined position by the VTR set 7 and then held by means of the pair of upper and lower chuck arm claws 58a, 59a. In the case of the small-sized cassette 12S, the projecting amount thereof with respect to the front wall 129 cannot be great and hence the cassette 12S is shallowly held by means of chuck arm claws 58a, 59a, resulting in difficulty being encountered to transfer the cassette 12S to the other position (the state of S1). Therefore, after the cassette 12S is taken out slightly by the chuck arm claws 58a, 59a, the cassette 12S is once released and then held again thereby so that the depth of holding becomes deep (the states of S2 and S3), and thereafter the cassette 12S is completely taken out from the cassette insertion portion 109 (the state of S4).

Although the inserting and discharging operation of the cassette 12 into and from the cassette storage cases 6, 16a, 16b by means of the manipulators 31a, 31b, 31c is varied in accordance with the cassette 12 being the regular-sized cassette 12R or being the small-sized cassette 12S (see FIG. 19), the basic operations therefor are the same as the case of FIG. 30 (R1) to (R3) and FIG. 31 (R1) to (R2).

The cassette changing portion 72 of the fixed cassette storage case 6 can go forward and back during the operation of the main robot 9 and the slide door 73 is openable and closable in association therewith.

Figure 32:
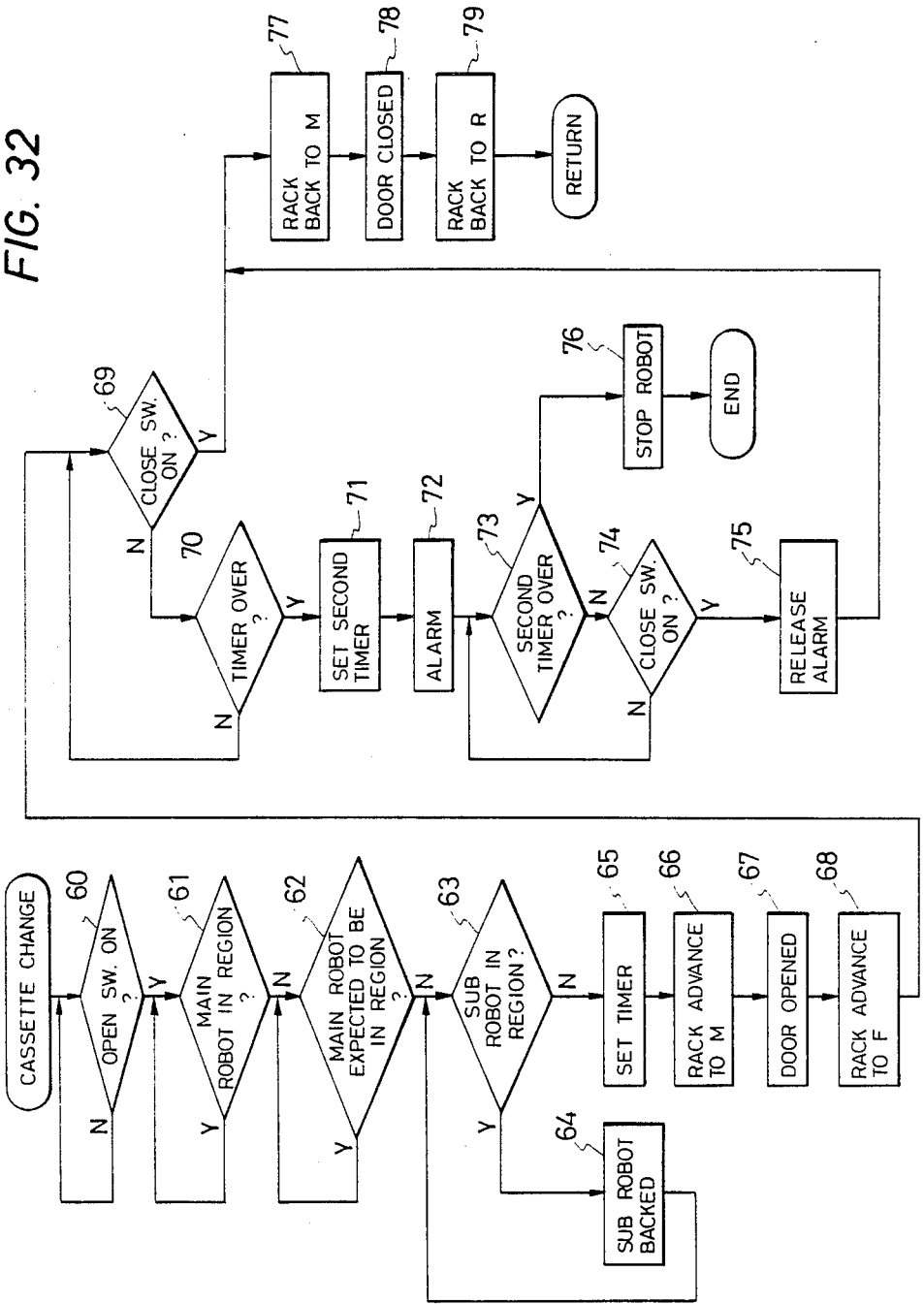
FIG. 32 is a flow chart showing the operative procedure of the cassette changing portion.

FIG. 32 is a flow chart showing control of the cassette changing portion and the slide door in the normal state (on cooperative movements of both the robots). In a step 60, it is checked whether or not the open switch 91p is turned on, and in steps 61 and 62, it is checked whether or not the main robot 9 is in the interference region (moving locus portion of the changing portion 72, i.e., front space thereof) or whether it reaches the region within a predetermined time period (for example, 3 minutes), and in a step 63, it is checked whether the subrobot 17 is in the interference region. In order to take out an unnecessary cassette 12 from the cassette changing portion 72 and supply a new cassette 12, when the open switch 91p is turned on, in the case that the main robot 9 is not in the interference region and it is not expected that it reaches there and the subrobot 17 is not in the interference region, a step 65 is executed so as to subtract a safety time from the remaining time until the main robot 9 subsequently reaches the interference region which the resultant time is set to a timer, and a series of processes of steps 65 to 68 are executed thereafter. That is, the movable rack case 74 of the cassette changing portion 72, as shown in FIG. 10, advances from a rear position R to an intermediate position M (step 66). At this intermediate position an end portion of the movable rack case 74 comes close to the back surface of the slide door 73. Thereafter, the slide door 73 is opened (step 67). In response to complete opening of the slide door 73, the movable rack case 74 further advances to reach an advance position F so that a portion thereof is projected to the outside of the basic unit box 5 (step 68), resulting in safety and easy exchange of the cassette 12 with person handling.

Irrespective of turning-on of the open switch 91p, when the main robot 9 is in the interference region and is expected to reach there within a predetermined time period, a time delay is effected until the state is varied (steps 61 and 62). Furthermore, when the subrobot 17 is in the interference region, it is moved outside of the interference region (steps 63 and 64). In a subsequent step 69, a decision is made in terms of whether the close switch 91q is turned on. If not, a step 70 is executed to check whether the timer is counted up and, if not completed, followed by the step 69. When in the step 65 the timer set time is elapsed and the counting is terminated, control goes to steps 71 and 72 to set a second timer and generate an alarm to demand the turning-on of the close switch 91q (it is also possible to use the first-mentioned timer as the second timer). When in a step 73 a decision is made in terms of the second timer being not counted completely, a step 74 is executed to again check whether or not the close switch 91q is turned on. If not, control returns to the step 73. When the close switch 91q is not turned on irrespective of a predetermined time period (for example 20 seconds) being elapsed after the second timer is set, the step 73 is executed to determine the fact that the second timer is completed and a step 76 is executed to urgently stop the robots. On the other hand, when the close switch 91q is turned on until the second timer is counted completely, a step 75 is executed to stop the alarm, followed by a step 77. When in the steps 69 or 74 the close switch 91q is turned on, in the step 77, the movable rack case 74 initially moves back from the advance position F to the intermediate position M, and in a step 78 the slide door is closed. In response to the complete closing thereof, a step 79 is executed such that the movable rack case 74 moves back from the intermediate position M to the rear position R, resulting in returning to the initial state.

The bar-code reader 67, on the initialization of the system and the like, reads the bar codes of the cassettes 12 stored in the cassette storage portions 13, 20 of all of the cassette storage cases 6, 16a and 16b and supplies the information thereof through the robot controller 8a to the operating station 110, the information being stored therein. Furthermore, the bar-code reader 67, on taking-out of the cassette 12, checks whether the cassette 12 is identical in content that instructed by the operating station 110. The bar code reader 67 is attached to the chuck base 54 and movable together with the chuck arms 58 and 59, while the reading is performed with it advancing a predetermined distance so that the distance to the bar code 69 becomes constant. Since the regular-sized cassette 12R and the small-sized cassette 12S are positioned according to the front side reference F as shown in FIG. 19, it is possible to accurately and easily perform the reading of the bar code 69 by the bar code reader 67.

Figure 33:
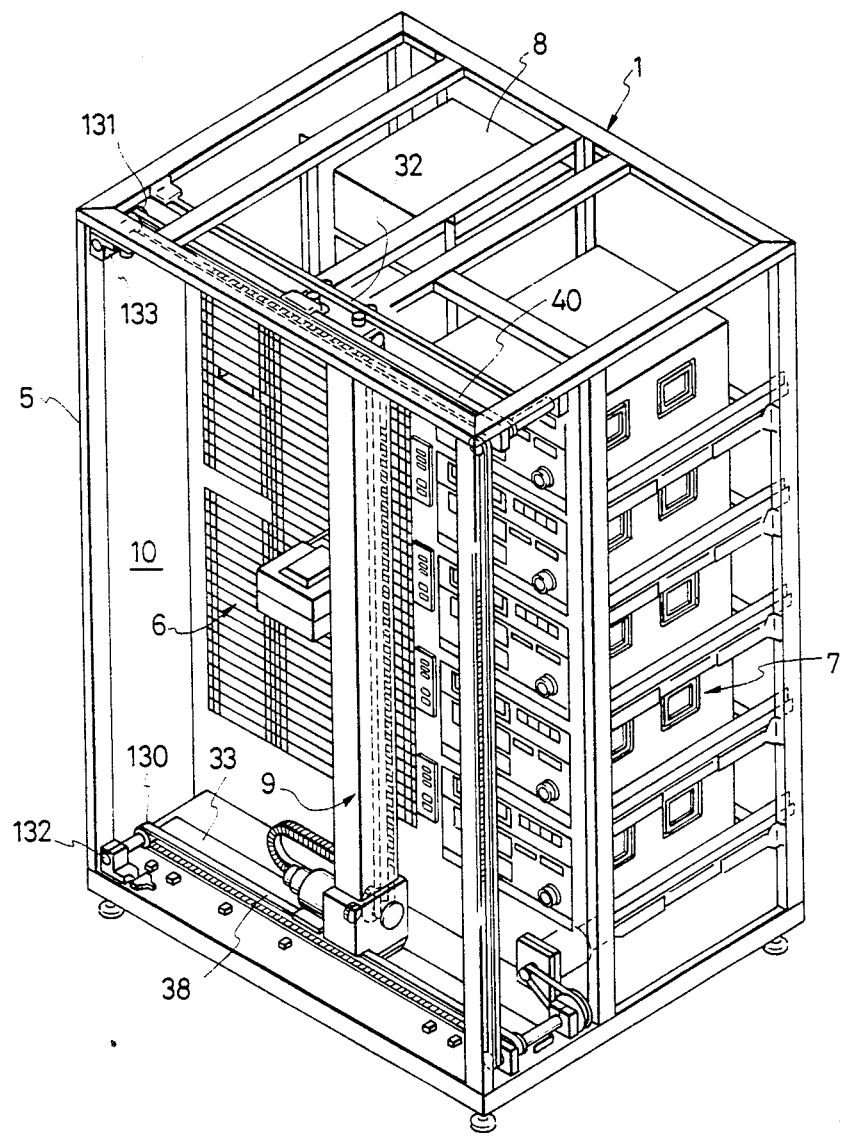
FIG. 33 is a perspective view showing the case of using only the basic unit.

FIG. 33 shows a state that the automatic cassette exchange is effected using only the basic unit 1. In this case, each of the first and second timing belts 38 and 40 has a length close to the width of the basic unit 1 and driven sprockets 130 and 131 therefor are respectively supported by bearings 132 and 133.

In the embodiment, although it is required that the first and second timing belts 38 and 40 are changed in accordance with the change between the case that only the basic unit 1 is used and the case that the addition units 2, 3 are connected thereto, the other parts can be used as it is. If the main robot 9 and the subrobot 17 are respectively arranged so as to move in the X directions by means of self-advancing motors attached to the body portions 29, the exchange of the timing belts is not necessary, resulting in easier connection thereof.

Although the main robot 9 has the pair of upper and lower manipulators 31a and 31b and the subrobot 17 has the single manipulator 31c, it is also appropriate that both the robots respectively have pair of manipulators or have single manipulators.

Furthermore, although in the embodiment the intermediate stations for delivery between the main robot 9 and the subrobot 17 are determined to be specific cassette storage portions 13m, 13n of the cassette changing portion 74, the present invention is not limited to this and it is also appropriate that they be at other specific places or at unspecific places.

It should be understood that the foregoing relates to only a preferred embodiment of the present invention, and that it is intended to cover all changes and modifications of the embodiments of the invention herein used for the purposes of the disclosure, which do not constitute departures from the spirit and scope of the invention.

What is claimed is:

1. A cassette exchanging system for exchanging a cassette to be loaded to information recording/reproducing means from cassette storage, comprising:
    a basic housing including said information recording/reproducing means and a fixed cassette storage means including at least one column of cassette encasing portions for encasing a plurality of cassettes, said fixed cassette storage means being fixedly aligned with said information recording/reproducing means within said basic housing to form a first space at the front of said basic housing, each of said cassette encasing portions having an entrance and exit port for each of said cassettes, said port being positioned to face said first space;
    first guide rail means fixedly disposed within said first space formed in said basic housing;
    manipulator means provided in said first space of said basic housing so as to be vertically movable and be horizontally movable along said first guide rail means, said manipulator means being further arranged for holding said cassettes and selectively carrying them to perform cassette exchanging operation between said information recording/reproducing means and said fixed cassette storage means;
    at least one addition housing;
    at least one rotatable type cassette storage means arranged to be rotatable about its own axis and having a plurality of columns of cassette encasing cases for encasing a number of cassettes, said rotatable type cassette storage means being disposed within said addition housing so as to form a second space at the front of said addition housing;
    second guide rail means fixedly disposed within said second space formed in said addition housing; and
    control means for controlling the movement of said manipulator means and the rotation of said rotatable type cassette storage means,
    wherein said addition housing is coupled to said basic housing so that said first and second spaces are in communication with each other and said first and second guide rail means are engaged with each other whereby said manipulator means is movable into said second space of said addition housing under control of said control means so as to allow cassette exchanging operation between said information recording/reproducing means and said fixed cassette storage means or said rotatable type cassette storage means.

2. A cassette exchanging system as claimed in claim 1, wherein said control means is placed in said first housing and at the rear of said fixed cassette storage means.

3. A cassette exchanging system as claimed in claim 1, wherein a predetermined portion of said fixed cassette storage means is used for the cassette exchange between said information recording/reproducing means and said rotatable type cassette storage means, a predetermined cassette in one cassette encasing case of said rotatable type cassette storage means being once transferred to said cassette encasing case of said predetermined portion of said fixing type cassette storage means and then transferred to said information recording/reproducing means, and said predetermined cassette being transferred to said cassette encasing case of said predetermined portion thereof after extraction from said information recording/reproducing means and then transferred so as to return to said cassette encasing case of said rotatable type cassette storage means.

4. A cassette exchanging system as claimed in claim 1, wherein said first and second guide rail means are placed on bottom surfaces of said basic housing and said addition housing and integrally coupled to each other when said basic housing and said addition housing are coupled to each other.

5. A cassette exchanging system for exchanging a cassette to be loaded to information recording/reproducing means from cassette storage, comprising:
    housing means in which said information recording/reproducing means is placed;
    cassette storage means placed in said housing means so as to be arranged in line with said information recording/reproducing means and to form a space at the front of said housing means;
    first manipulator means provided in said space and movable along guide rail means, which is disposed in said housing means, for performing cassette exchange between said information recording/reproducing means and a first cassette encasing case of said cassette storage means which is close to said information recording/reproducing means; and
    second manipulator means provided in said space and movable along said guide rail means for performing cassette exchange between said information recording/reproducing means and a second cassette encasing case of said cassette storage means which is placed further away from said information recording/reproducing means than said first cassette encasing case.

6. A cassette exchanging system for exchanging a cassette to be loaded to information recording/reproducing means from cassette storage, comprising:
    housing means in which said information recording/reproducing means is placed;

cassette storage means having a plurality of cassette encasing portions and arranged in said housing means in line with said information recording/reproducing means so as to form a space at the front of the housing means;

manipulator means comprising a main manipulator and a submanipulator which are provided in said space of said housing means and which are driven by drive means so as to perform cassette exchange between said information recording/reproducing means and said cassette storage means;

checking means for checking the operations of said main manipulator and said submanipulator to determine whether said main manipulator or said submanipulator malfunctions or normally operates, said checking means generating a signal indicative of the malfunction and a signal indicative of the normal operation; and control means for controlling said manipulator means through said drive means and responsive to the malfunction signal and the normal operation signal from said checking means for, when said main manipulator normally operates, controlling said main manipulator to perform the cassette exchange between said information recording/reproducing means and a first cassette encasing portion of said cassette storage means which is close to said information recording/reproducing means and controlling said submanipulator to effect the cassette exchange between a second cassette encasing portion of said cassette storage means, which is further away from said information recording/reproducing means than said first cassette encasing portion, and a predetermined cassette encasing portion of said cassette storage means and for, when said main manipulator malfunctions, controlling said submanipulator so as to perform the cassette exchange between said information recording/reproducing means and the overall cassette storage means.

7. A cassette exchanging system as claimed in claim 6, wherein said main manipulator and said submanipulator are movable along a guide rail provided in said housing means.

8. A cassette exchanging system for exchanging a cassette to be loaded for information recording/reproducing means from cassette storage, comprising:

housing means in which said information recording/reproducing means is placed;

cassette storage means having a plurality of cassette encasing portions and arranged in said housing means in line with said information recording/reproducing means so as to form a space at the front side of the housing means;

manipulator means comprising a main manipulator and a submanipulator which are provided in said space of said housing means and which are driven by drive means so as to perform cassette exchange between said information recording/reproducing means and said cassette storage means;

checking means for checking the operation of said submanipulator to determine whether said submanipulator malfunctions or normally operates, said checking means generating a signal indicative of the malfunction and a signal indicative of the normal operation; and control means for controlling said manipulator means through said drive means and responsive to the malfunction signal and the normal operation signal from said checking means for, when said submanipulator normally operates, controlling said main manipulator to perform the cassette exchanging between said information recording/reproducing means and a first cassette encasing portion of said cassette storage means which is closer to said information recording/reproducing means and controlling said submanipulator to effect cassette exchange between a predetermined cassette encasing portion of said cassette storage means and a second cassette encasing portion of said cassette storage means which is further away from said information recording/reproducing means than said first cassette encasing portion and for, when said submanipulator malfunctions, controlling said main manipulator to perform cassette exchange between said information recording/reproducing means and the overall cassette storage means.

9. A cassette exchanging system as claimed in claim 8, wherein said main manipulator and said submanipulator are movable along a guide rail provided in said housing means.

10. A cassette exchanging system for performing cassette exchange between information recording/reproducing means and cassette storage means having a plurality of cassette encasing portions for encasing pluralities of first and second cassettes different in dimension, said first cassette being greater in dimension than said second cassette, each of said cassette encasing portions being formed to accommodate both said first and second cassettes, comprising:

cassette-exchanging means movably provided so as to face said information recording/reproducing means and said plurality of cassette encasing portions of said cassette storage means, said cassette-exchanging means including at least one manipulator driven by drive means for holding said cassette and data-reading means for reading data indicated at the front surface of each of said cassettes to generate a cassette-size information signal; and control means arranged to control said manipulator through said drive means and responsive to the cassette-size information signal from said data-reading means to read the size information of said cassette, said control means, when said second small-sized cassette is encased in said cassette encasing portion of said cassette storage means, controlling said manipulator so that the front surface of said second small-sized cassette is coincident with a position corresponding to the front surface of said first large-sized cassette and, when said second small-sized cassette is inserted into a portion of said information recording/reproducing means, controlling said manipulator so that the rear surface of said second small-sized cassette is coincident with a position corresponding to the rear surface of said first large-sized cassette.

11. A cassette exchanging system as claimed in claim 10, wherein each of said cassette encasing portions of said cassette storage means has positioning means for positioning said second small-sixed cassette so that the front surface thereof is coincient with that of said first large-sized cassette when encased.

12. A cassette exchanging system for performing cassette exchange between information recording/reproducing means and cassette storage means having a plurality of cassette encasing portions for encasing a plurality of cassettes, comprising:

cassette-exchanging means having a pair of manipulators for holding said cassette to allow insertion and removal into and from said information recording/reproducing means and said cassette storage means, said pair of manipulators being independent of each other;

checking means for checking the operations of said pair of manipulators to determine whether said pair of manipulators malfunction or normally operate, said checking means generating a signal indicative of the malfunction or a signal indicative of the normal operation in accordance with the determination; and control means arranged to control the operations of said pair of manipulators and responsive to the malfunction signal and the normal operation signal, said control means, when said pair of manipulators normally operate, controlling one of said pair of manipulators to perform one of the insertion and removal operations of said cassette into and from said information recording/reproducing means and said cassette storage means and further controlling the other manipulator to perform the remainder operation and said control means, when one of said pair of manipulators malfunctions, controlling the other manipulator so as to perform all of the cassette exchange between said information recording/reproducing means and the cassette storage means.

13. A cassette exchanging system as claimed in claim 12, wherein each of said pair of manipulators is arranged to have a pair of chuck arms which holds said cassette with said manipulator facing an entrance and exit port of said cassette encasing portion.

14. A cassette exchanging system as claimed in claim 12, wherein said pair of manipulators are arranged so that one manipulator is above another and each of said pair of manipulators having means for reading information indicated on said cassette when it is in opposed relation to said cassette.

* * * * *